(12) United States Patent
Jogan et al.

(10) Patent No.: US 12,288,644 B2
(45) Date of Patent: Apr. 29, 2025

(54) FILM CAPACITOR

(71) Applicants: Shizuki Electric Co., Inc., Nishinomiya (JP); Murata Manufacturing Co., Ltd., Nagaokakyo (JP)

(72) Inventors: Satoru Jogan, Nagaokakyo (JP); Kimiaki Kikuchi, Nishinomiya (JP)

(73) Assignees: SHIZUKI ELECTRIC CO., INC., Nishinomiya (JP); MURATA MANUFACTURING CO., LTD., Nagaokakyo (JP)

( * ) Notice: Subject to any disclaimer, the term of this patent is extended or adjusted under 35 U.S.C. 154(b) by 210 days.

(21) Appl. No.: 18/299,244

(22) Filed: Apr. 12, 2023

(65) Prior Publication Data
US 2023/0245823 A1 Aug. 3, 2023

Related U.S. Application Data

(63) Continuation of application No. PCT/JP2021/036246, filed on Sep. 30, 2021.

(30) Foreign Application Priority Data

Oct. 16, 2020 (JP) .................. 2020-174726

(51) Int. Cl.
*H01G 4/018* (2006.01)
*H01G 4/32* (2006.01)

(52) U.S. Cl.
CPC .............. *H01G 4/018* (2013.01); *H01G 4/32* (2013.01)

(58) Field of Classification Search
None
See application file for complete search history.

(56) References Cited

U.S. PATENT DOCUMENTS 5,615,078 A * 3/1997 Hudis ............... H01G 4/38
361/312
5,905,628 A * 5/1999 Okuno ............... H01G 4/32
29/25.42

(Continued)

FOREIGN PATENT DOCUMENTS

DE 19734477 A1 * 2/1998 ............ H01G 13/00
JP H05109583 A 4/1993

(Continued)

OTHER PUBLICATIONS

International Search Report in PCT/JP2021/036246, mailed Dec. 21, 2021, 3 pages.

*Primary Examiner* — Dion R. Ferguson
(74) *Attorney, Agent, or Firm* — ArentFox Schiff LLP

(57) ABSTRACT

A film capacitor including a laminate including: a first dielectric film, a second dielectric film, a first metal layer, and a second metal layer, and defining a first end surface and a second end surface opposing each other in a width direction. The first and second dielectric films face each other in a thickness direction. The first and second end surfaces each define an unevenness having a height of 0.07 mm to 0.25 mm and a pitch of 0.07 mm to 0.15 mm continuously along the thickness direction. First gaps having a length of 0.3 mm or greater are between the second dielectric film and a first external electrode on the first end surface, and second gaps having a length of 0.3 mm or greater are between the first or second dielectric film without the second metal layer and a second external electrode on the second end surface.

15 Claims, 11 Drawing Sheets

(56) References Cited

U.S. PATENT DOCUMENTS

| | | | |
|---|---|---|---|
| 6,954,349 B2* | 10/2005 | Shiota | H01G 4/32 |
| | | | 361/302 |
| 2012/0033342 A1* | 2/2012 | Ito | H01G 4/30 |
| | | | 29/25.42 |
| 2013/0201604 A1* | 8/2013 | Masuda | H01G 4/018 |
| | | | 205/221 |
| 2015/0255217 A1* | 9/2015 | Nishiyama | H01G 4/30 |
| | | | 361/301.4 |
| 2019/0172642 A1* | 6/2019 | Yamazaki | H01G 4/18 |
| 2020/0273624 A1* | 8/2020 | Jogan | H01G 4/33 |
| 2022/0102072 A1* | 3/2022 | Inakura | H01G 4/18 |
| 2022/0108837 A1* | 4/2022 | Jogan | H01G 4/33 |
| 2022/0130611 A1* | 4/2022 | Jogan | H01G 4/32 |
| 2023/0245823 A1* | 8/2023 | Jogan | H01G 4/18 |
| | | | 361/301.5 |

FOREIGN PATENT DOCUMENTS

| | | | |
|---|---|---|---|
| JP | H05251266 A | | 9/1993 |
| JP | 2004363431 A | | 12/2004 |
| JP | 2009272461 A | * | 11/2009 |
| JP | 2013004916 A | | 1/2013 |
| WO | 2021038962 A1 | | 3/2021 |
| WO | WO-2021038973 A1 | * | 3/2021 |

* cited by examiner

FILM CAPACITOR

CROSS REFERENCE TO RELATED APPLICATIONS

The present application is a continuation of International application No. PCT/JP2021/036246, filed Sep. 30, 2021, which claims priority to Japanese Patent Application No. 2020-174726, filed Oct. 16, 2020, the entire contents of each of which are incorporated herein by reference.

FIELD OF THE INVENTION

The present invention relates to film capacitors.

BACKGROUND OF THE INVENTION

A known type of capacitor is a film capacitor that includes a flexible film as a dielectric film, a first metal layer, and a second metal layer opposing the first metal layer across the film. Such a film capacitor is produced by, for example, winding or laminating a film on which the first metal layer is formed and a film on which the second metal layer is formed and then forming external electrodes on both end surfaces of the resulting laminate.

Patent Literature 1 discloses a film capacitor including a wound metallized film and an electrode member connected to each end of the wound metallized film in a width direction, the wound metallized film including a stack of a first film member having a metal film on at least one surface thereof and a second film member. The first film member protrudes with respect to the second film member in the width direction. The wound metallized film has first protrusion ends and first recess ends alternating in a lamination direction. The metal film is exposed in portions where the first protrusion ends protrude from the first recess ends in the width direction.

Patent Literature 1: JP 2013-4916 A

SUMMARY OF THE INVENTION

Patent Literature 1 describes that the disclosed film capacitor can improve the mechanical strength of the contact portions between the metallized film and the electrode members without processing the first film member, because the alternating first protrusion ends and first recess ends allow the electrode members to easily connect to the metal film.

However, the film capacitor disclosed in Patent Literature 1 is not intended for use under repeated high and low temperature conditions. Use under repeated high and low temperature conditions causes repeated contraction and expansion. Such repeated contraction and expansion of the film capacitor causes repeated stress on the external electrodes, leading to an issue of an increase in the equivalent series resistance of the film capacitor.

The present invention was made to solve the above issue and aims to provide a film capacitor that reduces an increase in the equivalent series resistance even when used under repeated high and low temperature conditions.

The film capacitor of the present invention includes a laminate including: a first dielectric film including a first main surface and a second main surface opposing each other in a thickness direction; a first metal layer on the first main surface of the first dielectric film; a second dielectric film including a third main surface and a fourth main surface opposing each other in the thickness direction; and a second metal layer on one of the first main surface of the first dielectric film, the second main surface of the first dielectric film, and the third main surface of the second dielectric film, wherein: the first dielectric film and the second dielectric film are arranged such that the first main surface of the first dielectric film and the fourth main surface of the second dielectric film face each other in the thickness direction, and the second main surface of the first dielectric film and the third main surface of the second dielectric film face each other in the thickness direction, the laminate defines a first end surface and a second end surface opposing each other in a width direction, the width direction being perpendicular to the thickness direction; a first external electrode on the first end surface of the laminate, the first external electrode being connected to the first metal layer and not connected to the second metal layer; and a second external electrode on the second end surface of the laminate, the second external electrode being connected to the second metal layer and not connected to the first metal layer, wherein: of the first dielectric film and the second dielectric film adjacent to each other in the thickness direction, the first dielectric film with the first metal layer on the first main surface protrudes toward the first external electrode with respect to the second dielectric film without the first metal layer on the main surfaces; in a cross section along the thickness direction and the width direction, the first end surface of the laminate defines a first unevenness continuously along the thickness direction, the first unevenness having a profile defined by a curve that connects ends of the first dielectric film with the first metal layer on the first main surface; the first unevenness has a height of 0.07 mm to 0.25 mm and a pitch of 0.07 mm to 0.15 mm as measured based on JIS B 0601:2001; in the width direction, first gaps having a length in the width direction of 0.3 mm or greater are present between the second dielectric film without the first metal layer on the main surfaces and the first external electrode; of the first dielectric film and the second dielectric film adjacent to each other in the thickness direction, one of the first and second dielectric films with the second metal layer on one of the main surfaces protrudes toward the second external electrode with respect to the other of the first and second dielectric films without the second metal layer on the main surfaces; in the cross section along the thickness direction and the width direction, the second end surface of the laminate defines a second unevenness continuously along the thickness direction, the second unevenness having a profile defined by a curve that connects ends of the one of the first and second dielectric films with the second metal layer on one of the main surfaces; the second unevenness has a height of 0.07 mm to 0.25 mm and a pitch of 0.07 mm to 0.15 mm as measured based on JIS B 0601:2001; and in the width direction, second gaps having a length in the width direction of 0.3 mm or greater are present between the other of the first and second dielectric films without the second metal layer on the main surfaces and the second external electrode.

The present invention provides a film capacitor that reduces an increase in the equivalent series resistance even when used under repeated high and low temperature conditions.

DETAILED DESCRIPTION OF THE PREFERRED EMBODIMENTS

The film capacitor of the present invention is described below. The present invention is not limited to the following features and may be suitably modified without departing from the gist of the present invention. Combinations of two or more preferred features described in the following are also within the scope of the present invention.

The following embodiments are examples, and features of different embodiments can be partially exchanged or combined with each other. In Embodiment 2 and the subsequent embodiments, descriptions of features common to Embodiment 1 are omitted and different points are mainly described. In particular, similar advantageous effects by similar features are not mentioned in each preferred embodiment. The film capacitors of the embodiments are simply referred to as a "film capacitor of the present invention" when no particular distinction is needed between the embodiments.

Hereinafter, as an example of the film capacitor of the present invention, a wound film capacitor is described in which films, including a metallized film including a metal layer on a main surface of a dielectric film, are wound in a laminated state. The film capacitor of the present invention may be a laminated film capacitor in which films, including a metallized film including a metal layer on a main surface of a dielectric film, are laminated.

Embodiment 1

Figure 1:
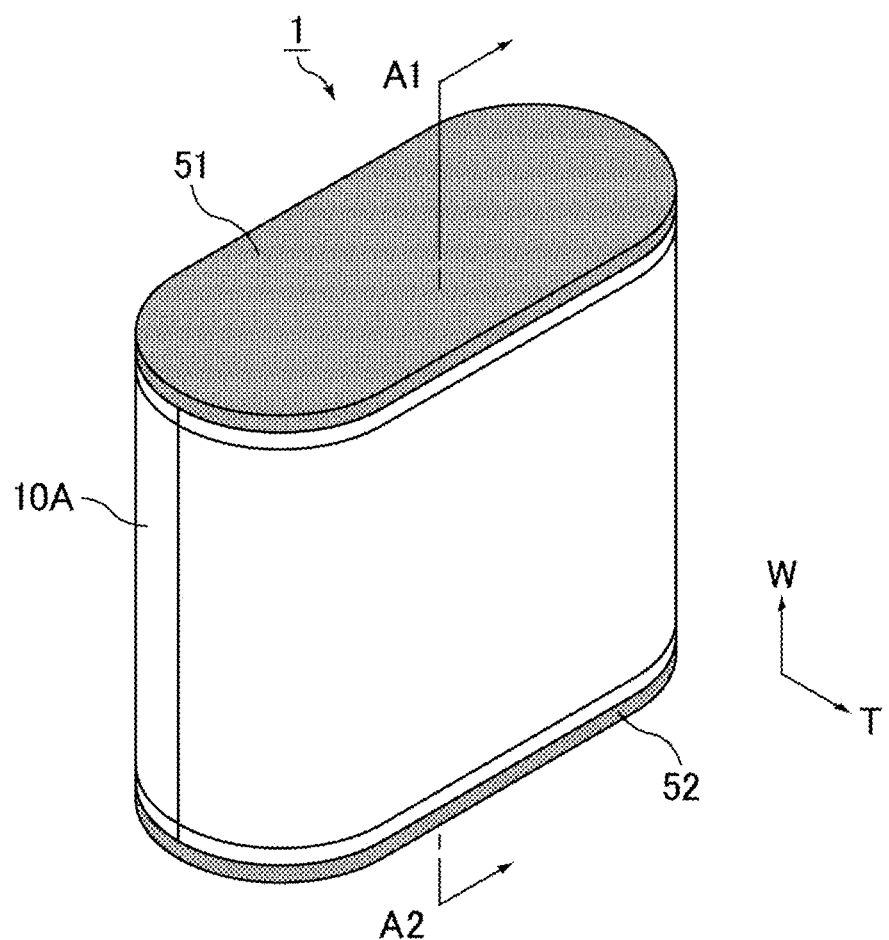
FIG. 1 is a schematic perspective view showing an example of a film capacitor of Embodiment 1 of the present invention.
Figure 2:
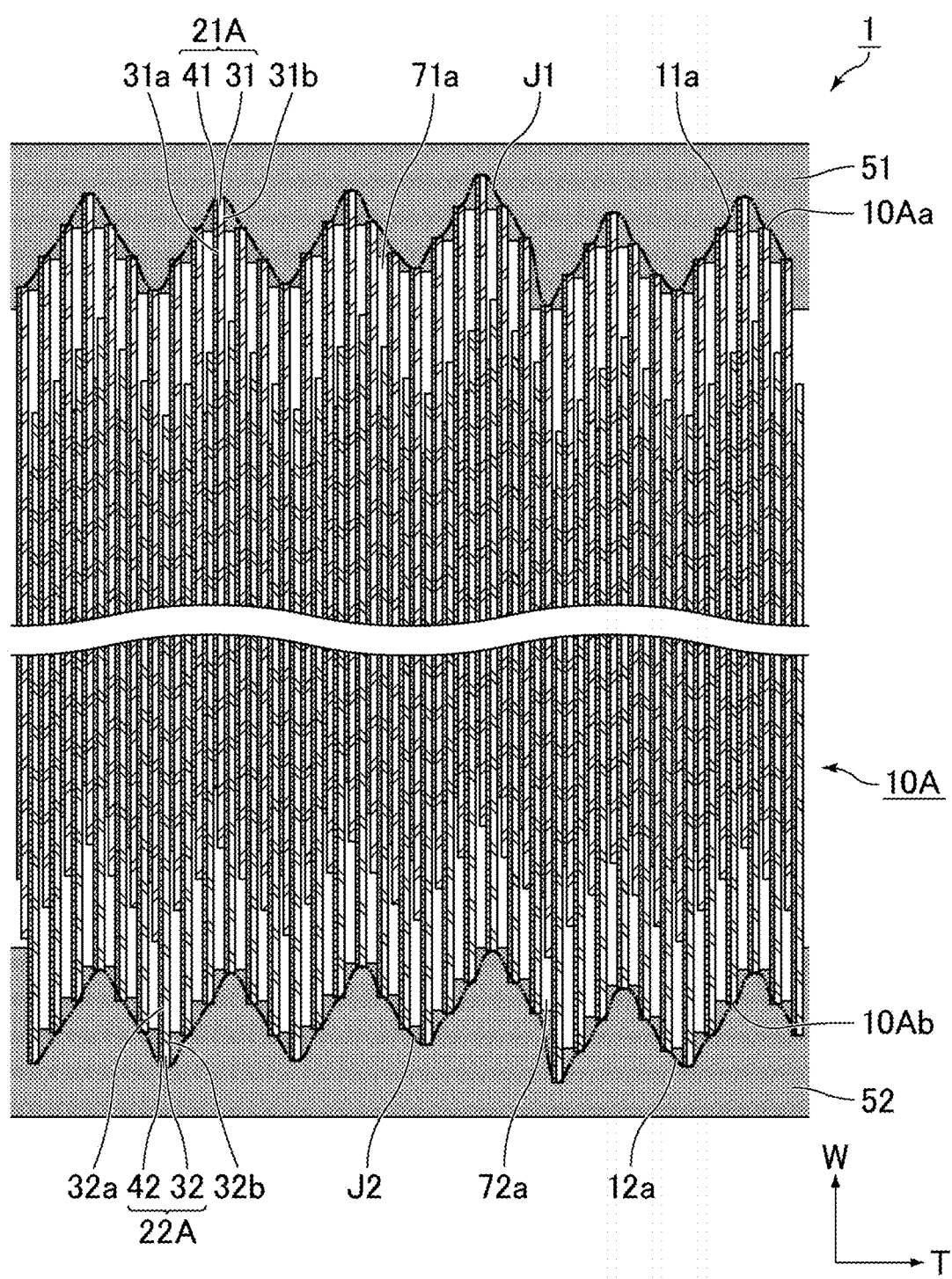
FIG. 2 is a schematic cross-sectional view showing a part of a section taken along line A1-A2 in FIG. 1.

FIG. 1 is a schematic perspective view showing an example of a film capacitor of Embodiment 1 of the present invention. FIG. 2 is a schematic cross-sectional view showing a part of a section taken along line A1-A2 in FIG. 1. Specifically, FIG. 2 shows a part of a region to the right of the vertical central axis in a cross section of the film capacitor shown in FIG. 3.

Herein, the thickness direction and the width direction in the film capacitor are the direction indicated by the arrow T and the direction indicated by the arrow W, respectively, as shown in FIG. 1, FIG. 2, and other figures. The thickness direction T and the width direction W are perpendicular to each other.

As shown in FIG. 1 and FIG. 2, a film capacitor 1 includes a laminate 10A, a first external electrode 51, and a second external electrode 52.

The laminate 10A includes a first end surface 10Aa and a second end surface 10Ab opposing each other in the width direction W.

The laminate 10A is a wound body in which a first metallized film 21A and a second metallized film 22A are wound while being laminated in the thickness direction T. In other words, the film capacitor 1 is a wound film capacitor including the laminate 10A that is a wound body.

To reduce the height of the film capacitor 1, the laminate 10A preferably has a flat cross-sectional shape when viewed in a cross section vertical to a spool direction (width direction W in FIG. 1). Specifically, the laminate 10A is preferably pressed to have a flat cross section such as an oval or oblong cross section so that the laminate 10A has a smaller thickness than that having a perfectly circular cross section.

Whether the laminate is pressed to have a flat cross section can be determined by, for example, checking whether a press mark is present on the laminate.

The film capacitor 1 may include a cylindrical winding shaft. The winding shaft is arranged along the central axis of the first metallized film 21A and the second metallized film 22A in a wound state and serves as a spool in winding the first metallized film 21A and the second metallized film 22A. The central axis of the first metallized film 21A and the second metallized film 22A in a wound state is not shown in FIG. 2 but located on the left side.

The first metallized film 21A includes a first dielectric film 31 and a first metal layer 41.

The first dielectric film 31 includes a first main surface 31a and a second main surface 31b opposing each other in the thickness direction T.

The first metal layer 41 is provided on the first main surface 31a of the first dielectric film 31. Specifically, the first metal layer 41 is provided on the first main surface 31a of the first dielectric film 31 such that it extends to a first side edge of the first dielectric film 31 but not to a second side edge of the first dielectric film 31 in the width direction W.

The second metallized film 22A includes a second dielectric film 32 and a second metal layer 42.

The second dielectric film 32 includes a third main surface 32a and a fourth main surface 32b opposing each other in the thickness direction T.

The second metal layer 42 is provided on the third main surface 32a of the second dielectric film 32. Specifically, the second metal layer 42 is provided on the third main surface 32a of the second dielectric film 32 such that it does not extend to a first side edge of the second dielectric film 32 but extends to a second side edge of the second dielectric film 32 in the width direction W.

In the laminate 10A, the first metallized film 21A and the second metallized film 22A adjacent to each other in the thickness direction T are shifted from each other in the width direction W such that the end of the first metal layer 41 which extends to the side edge of the first dielectric film 31 is exposed at the first end surface 10Aa of the laminate 10A and the end of the second metal layer 42 which extends to the side edge of the second dielectric film 32 is exposed at the second end surface 10Ab of the laminate 10A. In other words, of the first metallized film 21A and the second metallized film 22A adjacent to each other in the thickness direction T, the first metallized film 21A protrudes toward the first external electrode 51 with respect to the second metallized film 22A. Of the first metallized film 21A and the second metallized film 22A adjacent to each other in the thickness direction T, the second metallized film 22A protrudes toward the second external electrode 52 with respect to the first metallized film 21A. In this state, the first metal layer 41 is connected to the first external electrode 51 and not connected to the second external electrode 52. The second metal layer 42 is connected to the second external electrode 52 and not connected to the first external electrode 51.

In the laminate 10A, the first metallized film 21A and the second metallized film 22A adjacent to each other in the thickness direction T are shifted from each other in the width direction W as described above. Thus, of the first dielectric film 31 and the second dielectric film 32 adjacent to each other in the thickness direction T, the first dielectric film 31 provided with the first metal layer 41 on the first main surface 31a protrudes toward the first external electrode 51 with respect to the second dielectric film 32 not provided with the first metal layer 41 on the main surfaces. Of the first dielectric film 31 and the second dielectric film 32 adjacent to each other in the thickness direction T, the second dielectric film 32 provided with the second metal layer 42 on the third main surface 32a protrudes toward the second external electrode 52 with respect to the first dielectric film 31 not provided with the second metal layer 42 on the main surfaces.

The laminate 10A, in which the first metallized film 21A and the second metallized film 22A are wound while being laminated in the thickness direction T, can be regarded as including the first dielectric film 31, the first metal layer 41, the second dielectric film 32, and the second metal layer 42 sequentially in the thickness direction T. The laminate 10A can also be regarded as a wound body in which the first dielectric film 31, the first metal layer 41, the second dielectric film 32, and the second metal layer 42 that are wound while being sequentially laminated in the thickness direction T.

In the laminate 10A, the first main surface 31a of the first dielectric film 31 and the fourth main surface 32b of the second dielectric film 32 face each other in the thickness direction T, and the second main surface 31b of the first dielectric film 31 and the third main surface 32a of the second dielectric film 32 face each other in the thickness direction T. In this way, the first metallized film 21A and the second metallized film 22A in the laminate 10A are wound while being laminated in the thickness direction T. In other words, in the laminate 10A, the first metallized film 21A comes inside the second metallized film 22A. Specifically, the first metallized film 21A and the second metallized film 22A are wound while being laminated in the thickness direction T such that the first metal layer 41 comes inside the first dielectric film 31 and the second metal layer 42 comes inside the second dielectric film 32. In other words, in the laminate 10A, the first metal layer 41 and the second metal layer 42 face each other across the first dielectric film 31 or the second dielectric film 32.

The first metal layer 41 may include fuse portions. The fuse portions of the first metal layer 41 connect divided electrode portions, which are obtained by dividing the portion of the first metal layer 41 facing the second metal layer 42 into multiple portions, to an electrode portion not facing the second metal layer 42. Examples of electrode patterns for the first metal layer 41 provided with fuse portions include those disclosed in JP 2004-363431 A and JP H5-251266 A.

As with the first metal layer 41, the second metal layer 42 may include fuse portions.

The first dielectric film 31 may contain a curable resin as a main component.

The term "main component" as used herein refers to a component with the highest weight percentage, and preferably refers to a component whose weight percentage is more than 50 wt %.

The curable resin may be a thermosetting resin or a photocurable resin.

The thermosetting resin as used herein refers to a heat-curable resin, and the curing method is not limited. Thus, the thermosetting resin encompasses a resin curable by a method other than heat (e.g., light or electron beam) as long as the resin is heat-curable. Some materials may start a reaction due to their own reactivity. The thermosetting resin also encompasses such materials that do not necessarily require external heat or the like to start curing. The same applies to the photocurable resins. The photocurable resin encompasses a resin curable by a method other than light (e.g., heat) as long as the resin is photocurable.

The curable resin preferably includes a cured product of a first organic material containing hydroxy groups (OH groups) and a second organic material containing isocyanate groups (NCO groups). In this case, the curable resin includes a cured product having urethane bonds resulting from reaction between the hydroxy groups of the first organic material and the isocyanate groups of the second organic material.

The presence of urethane bonds in the first dielectric film 31 can be determined by analysis using a Fourier transform infrared spectrophotometer (FT-IR).

When the curable resin is obtained by the above reaction, the first dielectric film 31 may contain uncured residues of the starting materials. For example, the first dielectric film 31 may contain at least one of a hydroxy group or an isocyanate group. In this case, the first dielectric film 31 may contain either one or both of a hydroxy group and an isocyanate group.

The presence of a hydroxy group and/or an isocyanate group in the first dielectric film 31 can be determined by analysis using a FT-IR.

Examples of the first organic material include phenoxy resins, polyvinyl acetoacetal resins, and polyvinyl butyral resins.

The first organic material may be any combination of two or more organic materials.

Examples of the second organic material include aromatic polyisocyanates such as diphenylmethane diisocyanate (MDI) and tolylene diisocyanate (TDI) and aliphatic polyisocyanates such as hexamethylene diisocyanate (HDI). The second organic material may be a modified product of at least one of these polyisocyanates, or a mixture of at least one of these polyisocyanates and a modified product thereof.

The second organic material may be any combination of two or more organic materials.

The first dielectric film 31 may contain a thermoplastic resin as a main component.

Examples of the thermoplastic resin include polypropylene, polyethersulfone, polyetherimide, and polyarylate.

The first dielectric film 31 may contain additives that provide various functions.

Examples of additives include leveling agents for providing smoothness.

A preferred additive is one having a functional group that reacts with a hydroxy group and/or an isocyanate group and forming part of the crosslinked structure of the cured product. Examples of such an additive include a resin having at least one functional group selected from the group consisting of a hydroxy group, an epoxy group, a silanol group, and a carboxy group.

As with the first dielectric film 31, the second dielectric film 32 also may contain a curable resin as a main component or may contain a thermoplastic resin as a main component. As with the first dielectric film 31, the second dielectric film 32 also may contain additives.

The first dielectric film 31 and the second dielectric film 32 may have different compositions, but preferably have the same composition.

Preferably, the first dielectric film 31 and the second dielectric film 32 each have a thickness of 1 μm to 10 μm, more preferably 3 μm to 5 μm.

The first dielectric film 31 and the second dielectric film 32 may have different thicknesses, but preferably have the same thickness.

The thicknesses of the first dielectric film 31 and the second dielectric film 32 can be measured with an optical film thickness gauge.

Preferably, the first dielectric film 31 and the second dielectric film 32 are each produced by forming a resin solution containing resin materials such as those described above into a film shape and curing the film by heat treatment.

Examples of constituents of the first metal layer 41 and the second metal layer 42 include metals such as aluminum, zinc, titanium, magnesium, tin, and nickel.

The first metal layer 41 and the second metal layer 42 may have different compositions, but preferably have the same composition.

Preferably, the first metal layer 41 and the second metal layer 42 each have a thickness of 5 nm to 40 nm.

The first metal layer 41 and the second metal layer 42 may have different thicknesses, but preferably have the same thickness.

The thickness of the first metal layer 41 can be determined by observing a cross section of the first metallized film 21A in the thickness direction using a transmission electron microscope (TEM). The thickness of the second metal layer 42 can be determined in the same manner as for the thickness of the first metal layer 41.

Preferably, the first metal layer 41 and the second metal layer 42 are formed by vapor deposition of a metal such as any of those described above onto a main surface of the first dielectric film 31 and a main surface of the second dielectric film 32, respectively.

The first external electrode 51 is connected to the first end surface 10Aa of the laminate 10A. Specifically, the first external electrode 51 is in contact with the end of the first metal layer 41 exposed at the first end surface 10Aa of the laminate 10A and thereby connected to the first metal layer 41. The first external electrode 51 is not connected to the second metal layer 42.

The second external electrode 52 is connected to the second end surface 10Ab of the laminate 10A. Specifically, the second external electrode 52 is in contact with the end of the second metal layer 42 exposed at the second end surface 10Ab of the laminate 10A and thereby connected to the second metal layer 42. The second external electrode 52 is not connected to the first metal layer 41.

Examples of constituents of the first external electrode 51 and the second external electrode 52 include metals such as zinc, aluminum, tin, and zinc-aluminum alloys.

The first external electrode 51 and the second external electrode 52 may have different compositions, but preferably have the same composition.

Preferably, the first external electrode 51 and the second external electrode 52 are formed by thermally spraying a metal such as any of those mentioned above onto the first end surface 10Aa and the second end surface 10Ab of the laminate 10A, respectively.

In a cross section along the thickness direction T and the width direction W as shown in FIG. 2, the first end surface 10Aa of the laminate 10A includes first unevenness 11a continuously in the thickness direction T. The first unevenness 11a has a profile defined by a curve J1 that connects the ends of the first dielectric film 31 provided with the first metal layer 41 on the first main surface 31a. Specifically, the curve J1 connects the central points, in the thickness direction T, of the ends of the first dielectric film 31. In the laminate 10A, the first end surface 10Aa can be regarded as being defined by the curve J1 and having an uneven shape defined by the first unevenness 11a.

As described above, the first external electrode 51 is connected to the first end surface 10Aa of the laminate 10A. Specifically, the first external electrode 51 fills the recesses among the first unevenness 11a and is thereby connected to the first end surface 10Aa of the laminate 10A. Thus, the presence of the first unevenness 11a at the first end surface 10Aa of the laminate 10A tends to increase the contact area between the first metallized film 21A and the first external electrode 51.

Still, to reduce an increase in the equivalent series resistance even when the film capacitor 1 is used under repeated high and low temperature conditions, the mere presence of the first unevenness 11a at the first end surface 10Aa of the laminate 10A is not sufficient. It is important for the film capacitor 1 to have the following specifications.

The first unevenness 11a in the film capacitor 1 has a height of 0.07 mm to 0.25 mm and a pitch of 0.07 mm to 0.15 mm as measured based on JIS B 0601:2001. This leads to a sufficiently large contact area between the first metallized film 21A and the first external electrode 51 and thus tends to lead to a higher bonding between the first metallized film 21A and the first external electrode 51. As a result, the film capacitor 1 when used under repeated high and low temperature conditions can be more resistant to tensile stress occurring in the first external electrode 51, thus reducing separation of the first metallized film 21A from the first external electrode 51 due to the tensile stress, and more easily maintaining the bonded state of the first metallized film 21A and the first external electrode 51.

First unevenness 11a having a height of less than 0.07 mm lead to an insufficient contact area between the first metallized film 21A and the first external electrode 51, and thus are less likely to lead to a higher bonding between the first metallized film 21A and the first external electrode 51.

First unevenness 11a having a height of greater than 0.25 mm tend to cause the first dielectric film 31 to tilt and block the recesses among the first unevenness 11a, hindering the thermally sprayed metal from entering the recesses among the first unevenness 11a when the metal is thermally sprayed to form the first external electrode 51. This results in an insufficient contact area between the first metallized film 21A and the first external electrode 51, and thus is less likely to lead to a higher bonding between the first metallized film 21A and the first external electrode 51.

First unevenness 11a having a pitch of less than 0.07 mm hinder the thermally sprayed metal from entering the recesses among the first unevenness 11a when the metal is thermally sprayed to form the first external electrode 51. This results in an insufficient contact area between the first metallized film 21A and the first external electrode 51, and thus is less likely to lead to a higher bonding between the first metallized film 21A and the first external electrode 51.

First unevenness 11a having a pitch of greater than 0.15 mm lead to an insufficient contact area between the first metallized film 21A and the first external electrode 51, and thus are less likely to lead to a higher bonding between the first metallized film 21A and the first external electrode 51.

In the film capacitor 1, first gaps 71a are present in the width direction W between the second dielectric film 32 not provided with the first metal layer 41 on the main surfaces and the first external electrode 51. In other words, in the film capacitor 1, the second dielectric film 32 and the first external electrode 51 are spaced from each other in the width direction W by the presence of the first gaps 71a. In a cross section along the thickness direction T and the width direction W as shown in FIG. 2, the ends of each first gap 71a in the width direction W are defined by the second dielectric film 32 and the first external electrode 51. The ends of each first gap 71a in the thickness direction T are defined by portions of the first metallized film 21A facing each other across the second dielectric film 32.

The first gaps 71a have a length in the width direction W of 0.3 mm or greater. The first gaps 71a having the above length in the width direction W easily buffer compressive stress occurring in the first external electrode 51 when the film capacitor 1 is used under repeated high and low temperature conditions. In particular, the laminate 10A easily deforms at the first gaps 71a upon expansion of the film capacitor 1, allowing easy buffering of compressive stress occurring in the first external electrode 51.

First gaps 71a having a length in the width direction W of less than 0.3 mm are less likely to buffer compressive stress occurring in the first external electrode 51.

Too long a length of the first gaps 71a in the width direction W may result in too long a length of the film capacitor 1 in the width direction W, which may make it difficult to downsize the film capacitor 1. From this standpoint, the first gaps 71a preferably have a length in the width direction W of 1.5 mm or less.

The first gaps 71a preferably have a length in the width direction W of 0.5 mm to 1.5 mm. This allows easy buffering of compressive stress occurring in the first external electrode 51 when the film capacitor 1 is used under repeated high and low temperature conditions, and also makes it easy to downsize the film capacitor 1.

As described above, of the first dielectric film 31 and the second dielectric film 32 adjacent to each other in the thickness direction T, the first dielectric film 31 protrudes toward the first external electrode 51 with respect to the second dielectric film 32. The length of the first gaps 71a in the width direction W is not greater than the protruding length of the first dielectric film 31 in the width direction W with respect to the second dielectric film 32. Specifically, the length of the first gaps 71a in the width direction W may be the same as or smaller than the protruding length of the first dielectric film 31 in the width direction W with respect to the second dielectric film 32.

As described above, in the film capacitor 1, the first unevenness 11a has a height and a pitch in the above ranges, and the first gaps 71a have a length in the width direction W in the above range. This allows the film capacitor 1 to be more resistant to tensile stress and easily buffer compressive stress when used under repeated high and low temperature conditions, thus reducing cracking near the boundary between the first metallized film 21A and the first external electrode 51. The film capacitor 1 thus can reduce an increase in the equivalent series resistance even when used under repeated high and low temperature conditions.

In a cross section along the thickness direction T and the width direction W as shown in FIG. 2, the second end surface 10Ab of the laminate 10A includes second unevenness 12a continuously in the thickness direction T. The second unevenness 12a has a profile defined by a curve J2 that connects the ends of the second dielectric film 32 provided with the second metal layer 42 on the third main surface 32a. Specifically, the curve J2 connects the central points, in the thickness direction T, of the ends of the second dielectric film 32. In the laminate 10A, the second end surface 10Ab can be regarded as being defined by the curve J2 and having an uneven shape defined by the second unevenness 12a.

As described above, the second external electrode 52 is connected to the second end surface 10Ab of the laminate 10A. Specifically, the second external electrode 52 fills the recesses among the second unevenness 12a and is thereby connected to the second end surface 10Ab of the laminate 10A. Thus, the presence of the second unevenness 12a at the second end surface 10Ab of the laminate 10A tends to increase the contact area between the second metallized film 22A and the second external electrode 52.

The second unevenness 12a in the film capacitor 1 has a height of 0.07 mm to 0.25 mm and a pitch of 0.07 mm to 0.15 mm as measured based on JIS B 0601:2001. This leads to a sufficiently large contact area between the second metallized film 22A and the second external electrode 52 and thus tends to lead to a higher bonding between the second metallized film 22A and the second external electrode 52. As a result, the film capacitor 1 when used under repeated high and low temperature conditions can be more resistant to tensile stress occurring in the second external electrode 52, thus reducing separation of the second metallized film 22A from the second external electrode 52 due to the tensile stress, and more easily maintaining the bonded state of the second metallized film 22A and the second external electrode 52.

The height of the second unevenness 12a may be the same as or different from the height of the first unevenness 11a.

The pitch of the second unevenness 12a may be the same as or different from the pitch of the first unevenness 11a.

In the film capacitor 1, second gaps 72a are present in the width direction W between the first dielectric film 31 not provided with the second metal layer 42 on the main surfaces and the second external electrode 52. In other words, in the film capacitor 1, the first dielectric film 31 and the second external electrode 52 are spaced from each other in the width direction W by the presence of the second gaps 72a. In a cross section along the thickness direction T and the width direction W as shown in FIG. 2, the ends of each second gap 72a in the width direction W are defined by the first dielectric film 31 and the second external electrode 52. The ends of each second gap 72a in the thickness direction T are defined by portions of the second metallized film 22A facing each other across the first dielectric film 31.

The second gaps 72a have a length in the width direction W of 0.3 mm or greater. The second gaps 72a having the above length in the width direction W easily buffer compressive stress occurring in the second external electrode 52 when the film capacitor 1 is used under repeated high and low temperature conditions. In particular, the laminate 10A easily deforms at the second gaps 72a upon expansion of the film capacitor 1, allowing easy buffering of compressive stress occurring in the second external electrode 52.

The second gaps 72a preferably have a length in the width direction W of 1.5 mm or less.

The second gaps 72a preferably have a length in the width direction W of 0.5 mm to 1.5 mm.

The length of the second gaps 72a in the width direction W may be the same as or different from the length of the first gaps 71a in the width direction W.

As described above, of the first dielectric film 31 and the second dielectric film 32 adjacent to each other in the thickness direction T, the second dielectric film 32 protrudes toward the second external electrode 52 with respect to the first dielectric film 31. The length of the second gaps 72a in the width direction W is not greater than the protruding length of the second dielectric film 32 in the width direction W with respect to the first dielectric film 31. Specifically, the length of the second gaps 72a in the width direction W may be the same as or smaller than the protruding length of the second dielectric film 32 in the width direction W with respect to the first dielectric film 31.

As described above, in the film capacitor 1, the second unevenness 12a has a height and a pitch in the above ranges, and the second gaps 72a have a length in the width direction W in the above range. This allows the film capacitor 1 to be more resistant to tensile stress and easily buffer compressive stress when used under repeated high and low temperature conditions, thus reducing cracking near the boundary between the second metallized film 22A and the second external electrode 52. The film capacitor 1 thus can reduce an increase in the equivalent series resistance even when used under repeated high and low temperature conditions.

The above-described specifications of the film capacitor 1 are determined using a sample prepared as follows.

Figure 3:
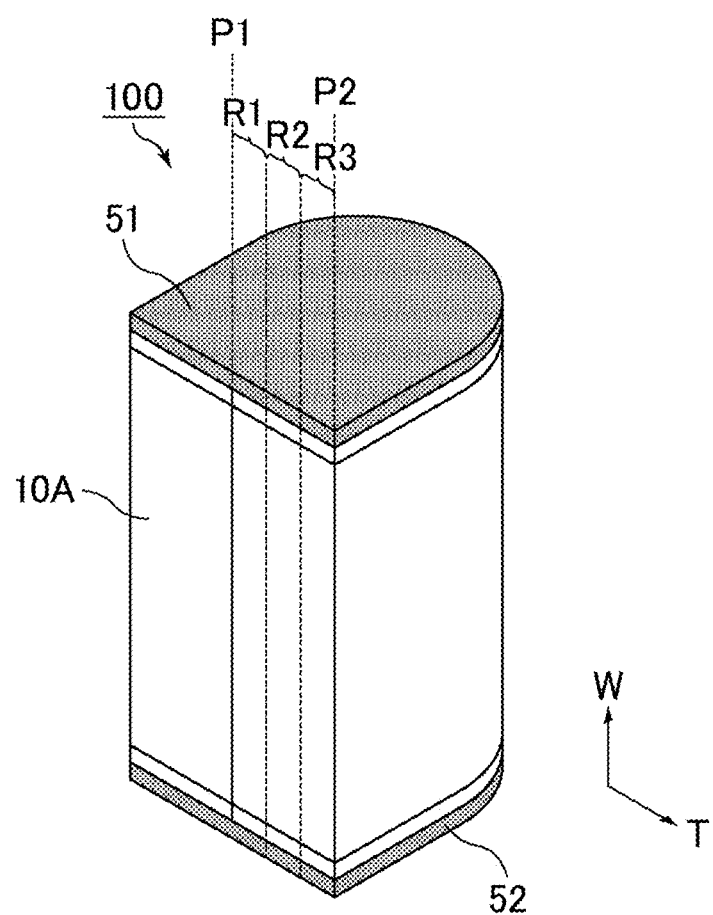
FIG. 3 is a schematic perspective view showing a sample for determining the specifications of a film capacitor.

FIG. 3 is a schematic perspective view showing a sample for determining the specifications of a film capacitor.

First, the film capacitor 1 shown in FIG. 1 is encapsulated with an encapsulation resin and then cut with a precision cutter "ISOMET 1000", produced by Buehler, to give a sample 100 having a cross section as shown in FIG. 3. The encapsulation resin used to encapsulate the film capacitor 1 is omitted in FIG. 3.

Next, the cross section of the sample 100 is polished with a rotary automatic grinder polisher "ECOMET 30", produced by Buehler, while a load of 0.04 N/mm$^2$ to 0.1 N/mm$^2$ is applied to the cross section of the sample 100 including the encapsulation resin. At this time, the rotation rates of the sample holder and the polishing plate are 150 rpm. The grit sizes of SiC water-proof abrasive papers used for polishing and the durations of polishing with the SiC water-proof abrasive papers are as follows: 10 minutes with #320, 3 minutes with #600, 3 minutes with #1000, and 3 minutes with #1500, in order of use of the SiC water-proof abrasive papers. The cross section of the sample 100 is then mirror-finished with diamond suspensions with abrasive grain sizes of 3 μm and 1 μm.

The above process produces the sample 100 for determining the specifications of the film capacitor 1.

The height of the first unevenness 11a is determined as follows in the sample 100 shown in FIG. 3.

Figure 4:
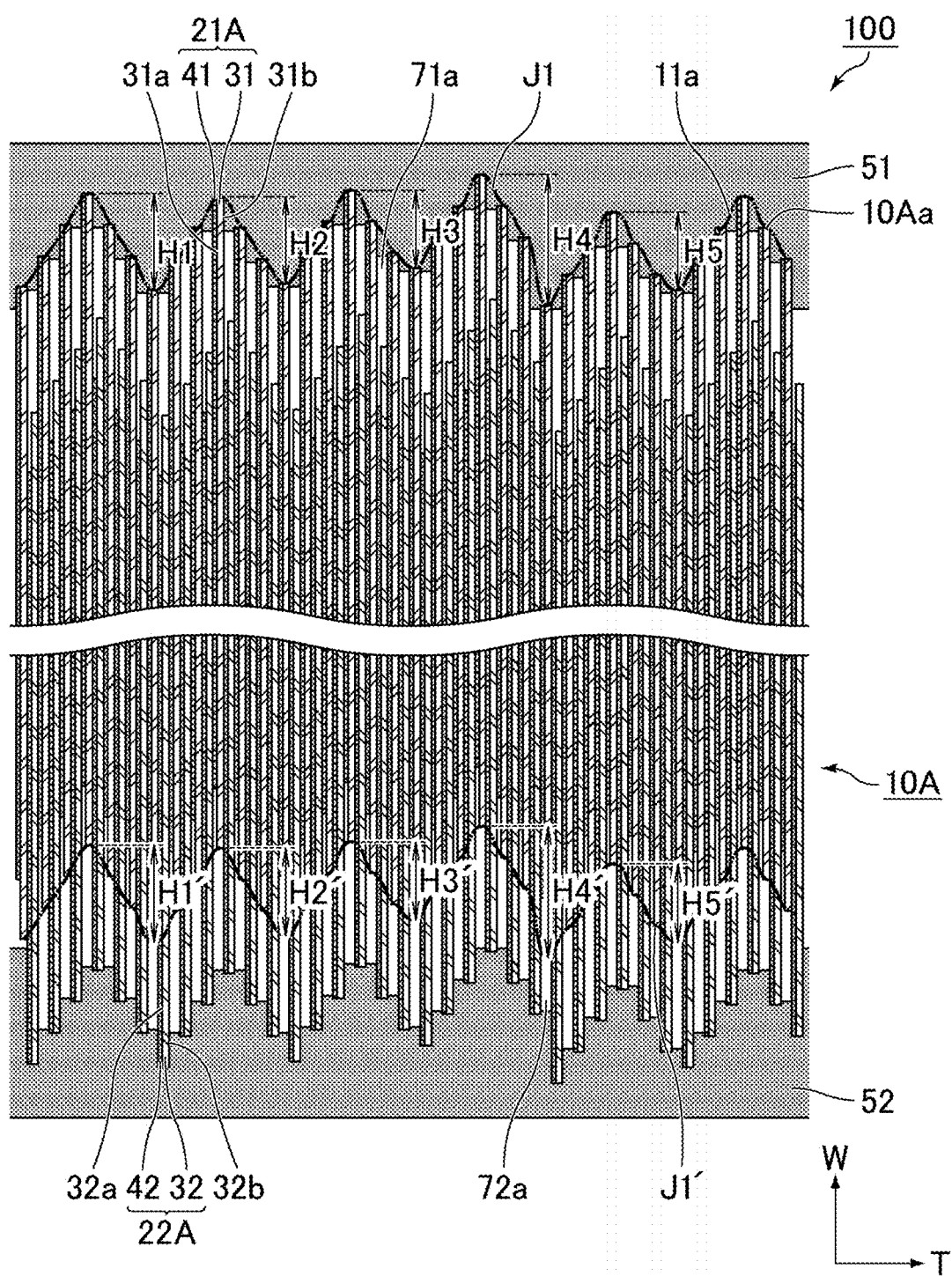
FIG. 4 is a schematic cross-sectional view showing a part of a cross section of the sample in FIG. 3 to illustrate a method of determining the height of first unevenness.

FIG. 4 is a schematic cross-sectional view showing a part of a cross section of the sample in FIG. 3 to illustrate a method of determining the height of the first unevenness.

First, a cross section of the sample 100 shown in FIG. 3 is enlarged 75 times to 200 times with a scanning electron microscope (SEM) or an optical microscope so as to observe a cross section of the sample 100 as shown in FIG. 4. Image analysis software is then used to draw in this observation field the curve J1 that connects the ends of the first dielectric film 31 that are adjacent to the first external electrode 51. Specifically, the curve J1 connects the central points, in the thickness direction T, of the ends of the first dielectric film 31. Next, on the curve J1, a height H1, a height H2, a height H3, a height H4, and a height H5 of five profile elements (each element is a pair of a peak and an adjacent valley) consecutive in the thickness direction T are measured based on JIS B 0601:2001. This measurement of the heights of the profile elements is performed at each of the central portions, in the thickness direction T, of a region R1, a region R2, and a region R3 in the cross section of the sample 100 shown in FIG. 3. The region R1, the region R2, and the region R3 are three equally sized regions in the thickness direction T in order from a winding start position P1 to a winding end position P2 of the metallized films. This measurement provides a total of 15 measured values of the heights of the profile elements in the region R1, the region R2, and the region R3. The average of these 15 measured values is calculated and defined as the height of the first unevenness 11a.

In determining the height of the first unevenness 11a with the above method, the heights of the profile elements are measured on the curve J1 that connects the ends of the first dielectric film 31 that are adjacent to the first external electrode 51. Meanwhile, a curve J1' that connects the ends of the first dielectric film 31 that are adjacent to the second external electrode 52 also has an uneven shape similar to that of the first unevenness 11a. When the first external electrode 51 is formed by thermally spraying a metal, the curve J1' may be easier to clearly define than the curve J1 because in the dielectric film 31, the ends adjacent to the second external electrode 52 are less likely to be affected by the thermal spraying of the metal than the ends adjacent to the first external electrode 51. Considering this, the heights of the profile elements may be measured on the curve J1'. In this case, the same method as described above may be used except that a height H1', a height H2', a height H3', a height H4', and a height H5' of five profile elements consecutive in the thickness direction T are measured on the curve J1' based on JIS B 0601:2001 at each of the central portions, in the thickness direction T, of the region R1, the region R2, and the region R3.

In determining the height of the first unevenness 11a, when the average height of the profile elements for the curve J1 and the average height of the profile elements for the curve J1' have a significant difference at a significance level of 5%, the average height of the profile elements for the curve J1' has priority.

The height of the second unevenness 12a is determined in the same manner as for the height of the first unevenness 11a.

The pitch of the first unevenness 11a is determined as follows in the sample 100 shown in FIG. 3.

Figure 5:
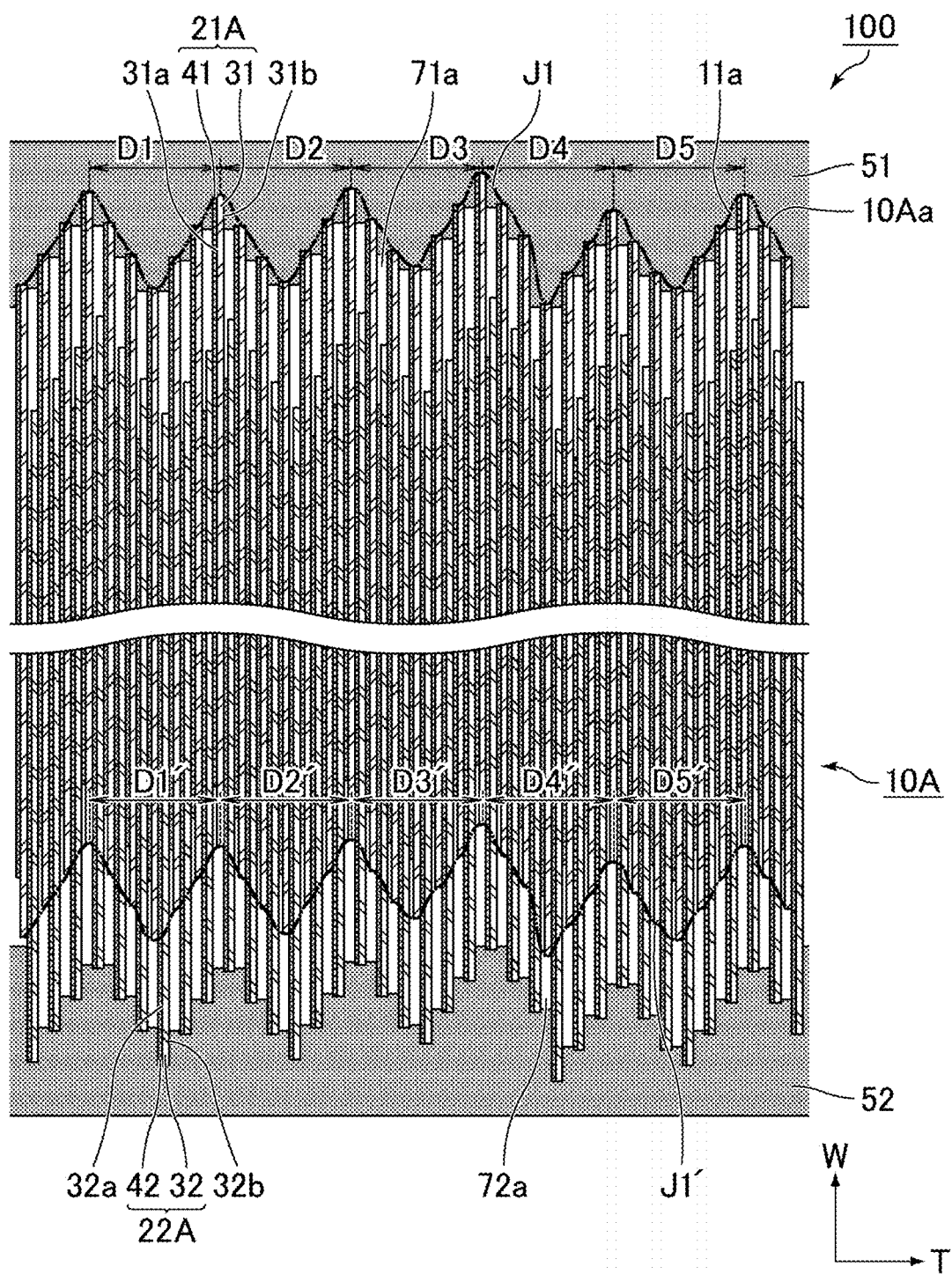
FIG. 5 is a schematic cross-sectional view showing a part of a cross section of the sample in FIG. 3 to illustrate a method of determining the pitch of the first unevenness.

FIG. 5 is a schematic cross-sectional view showing a part of a cross section of the sample in FIG. 3 to illustrate a method of determining the pitch of the first unevenness.

First, in a cross section of the sample 100 as shown in FIG. 5 similar to FIG. 4, a length D1, a length D2, a length D3, a length D4, and a length D5 of five profile elements consecutive in the thickness direction T are measured on the curve J1 based on JIS B 0601:2001. This measurement of the lengths of the profile elements is performed at each of the central portions, in the thickness direction T, of the region R1, the region R2, and the region R3 in the cross section of the sample 100 shown in FIG. 3. This measurement provides a total of 15 measured values of the lengths of the profile elements in the region R1, the region R2, and the region R3. The average of these 15 measured values is calculated and defined as the pitch of the first unevenness 11a.

In determining the pitch of the first unevenness 11a, the lengths of the profile elements may be measured on the curve J1', as with determining the height of the first unevenness 11a. In this case, the same method as described above may be used except that a length D1', a length D2', a length D3', a length D4', and a length D5' of five profile elements consecutive in the thickness direction T are measured on the curve J1' based on JIS B 0601:2001 at each of the central portions, in the thickness direction T, of the region R1, the region R2, and the region R3.

In determining the pitch of the first unevenness 11a, when the average length of the profile elements for the curve J1 and the average length of the profile elements for the curve J1' have a significant difference at a significance level of 5%, the average length of the profile elements for the curve J1' has priority.

The pitch of the second unevenness 12a is determined in the same manner as for the pitch of the first unevenness 11a.

The length of the first gaps 71a in the width direction W is determined as follows in the sample 100 shown in FIG. 3.

Figure 6:
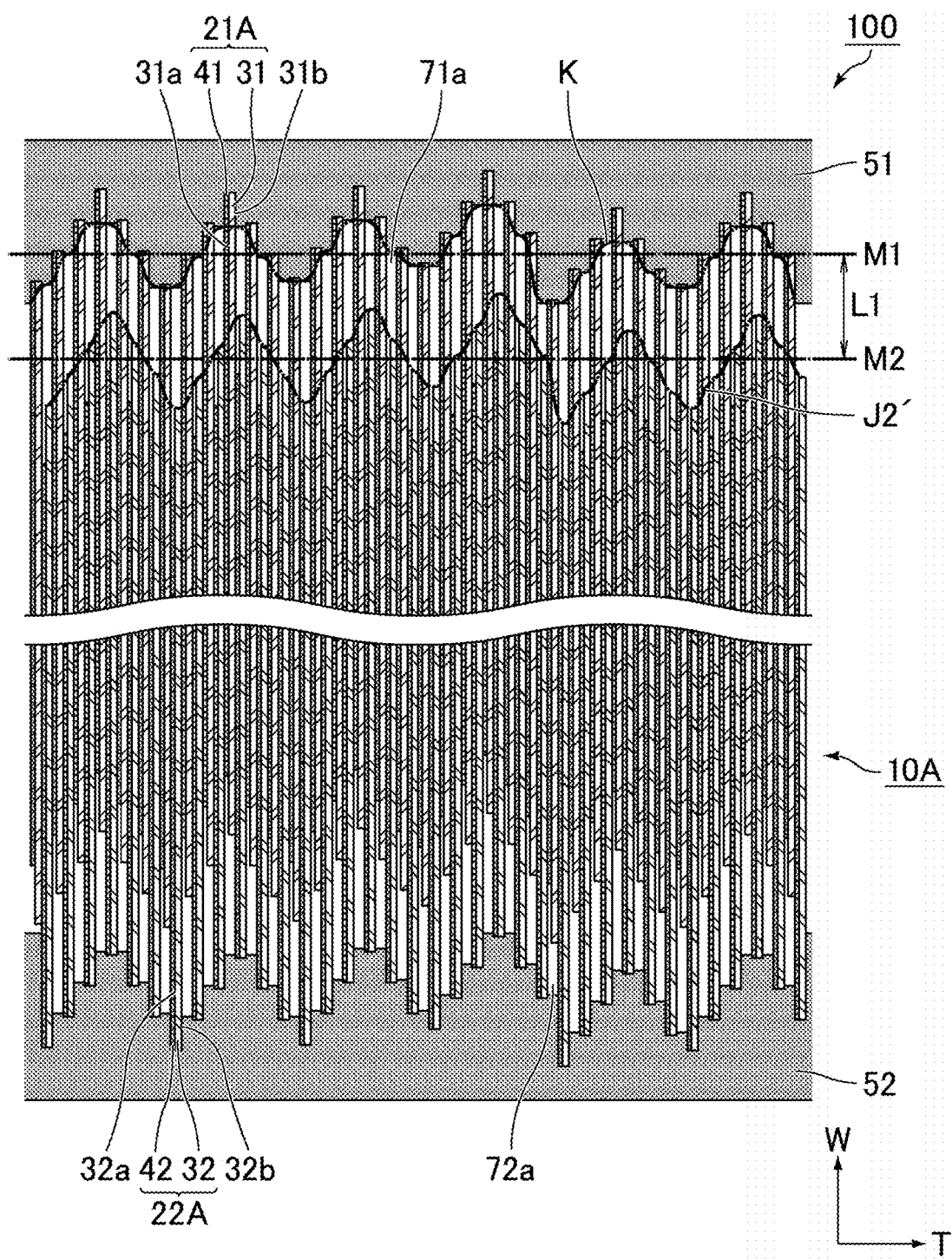
FIG. 6 is a schematic cross-sectional view showing a part of a cross section of the sample in FIG. 3 to illustrate a method of determining the length of first gaps in the width direction.

FIG. 6 is a schematic cross-sectional view showing a part of a cross section of the sample in FIG. 3 to illustrate a method of determining the length of the first gaps in the width direction.

First, in a cross section of the sample 100 as shown in FIG. 6 similar to FIG. 4, a curve K that connects the ends of the first external electrode 51 that are in contact with the first gaps 71a is drawn with image analysis software. Specifically, the curve K connects the central points, in the thickness direction T, of the ends of the first external electrode 51. Further, a curve J2' that connects the ends of the second dielectric film 32 that are adjacent to the first external electrode 51 is also drawn with image analysis software. Specifically, the curve J2' connects the central points, in the thickness direction T, of the ends of the second dielectric film 32. Next, a central line M1 for the curve K and a central line M2 for the curve J2' are drawn with image analysis software based on JIS B 0601:2001. The distance in the width direction W between the central line M1 and the central line M2, that is, a distance L1 between the central lines, is then measured. This measurement of the distance between the central lines is performed at each of the central portions, in the thickness direction T, of the region R1, the region R2, and the region R3 in the cross section of the sample 100 shown in FIG. 3. This measurement provides a total of three measured values of the distance between the central lines in the region R1, the region R2, and the region R3. The average of these three measured values is calculated and defined as the length of the first gaps 71a in the width direction W.

The length of the second gaps 72a in the width direction W is determined in the same manner as for the length of the first gaps 71a in the width direction W.

The film capacitor 1 is produced by the following method, for example.

Step of Preparing Metallized Films

Figure 7:
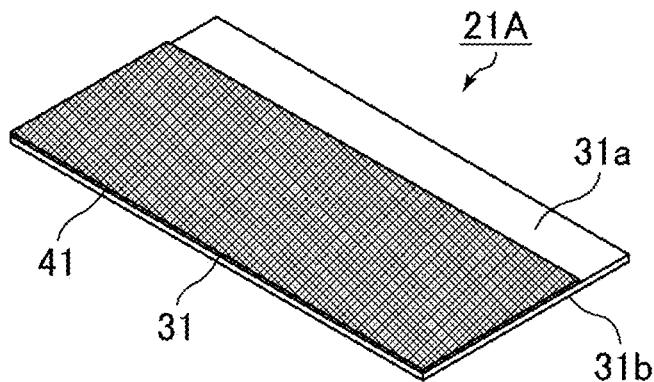
FIG. 7 is a schematic perspective view showing a step of preparing a first metallized film in an example of a method of producing the film capacitor of Embodiment 1 of the present invention.
Figure 8:
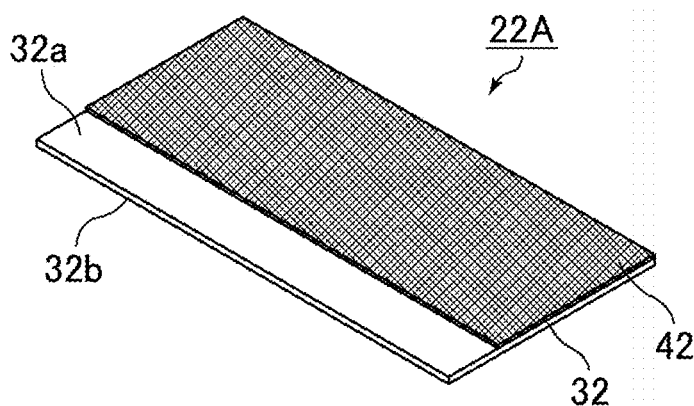
FIG. 8 is a schematic perspective view showing a step of preparing a second metallized film in an example of a method of producing the film capacitor of Embodiment 1 of the present invention.

FIG. 7 is a schematic perspective view showing a step of preparing the first metallized film in an example of a method of producing the film capacitor of Embodiment 1 of the present invention. FIG. 8 is a schematic perspective view showing a step of preparing the second metallized film in an example of a method of producing the film capacitor of Embodiment 1 of the present invention.

First, for example, the first organic material, the second organic material, additives, and the like described above are mixed to prepare a resin solution. The obtained resin solution is formed into a film shape and cured by heat treatment to prepare the first dielectric film 31 and the second dielectric film 32 as shown in FIG. 7 and FIG. 8.

Next, as shown in FIG. 7, the first metal layer 41 is formed on the first main surface 31a of the first dielectric film 31 by vapor deposition of a metal such as aluminum, zinc, titanium, magnesium, tin, or nickel, for example, to prepare the first metallized film 21A. At this time, the first metal layer 41 is formed such that it extends to the first side edge of the first dielectric film 31 but not to the second side edge of the first dielectric film 31 in the width direction.

Further, as shown in FIG. 8, the second metal layer 42 is formed on the third main surface 32a of the second dielectric film 32 by vapor deposition of a metal such as aluminum, zinc, titanium, magnesium, tin, or nickel, for example, to prepare the second metallized film 22A. At this time, the second metal layer 42 is formed such that it does not extend to the first side edge of the second dielectric film 32 but extends to the second side edge of the second dielectric film 32 in the width direction.

Step of Preparing Laminate

Figure 9:
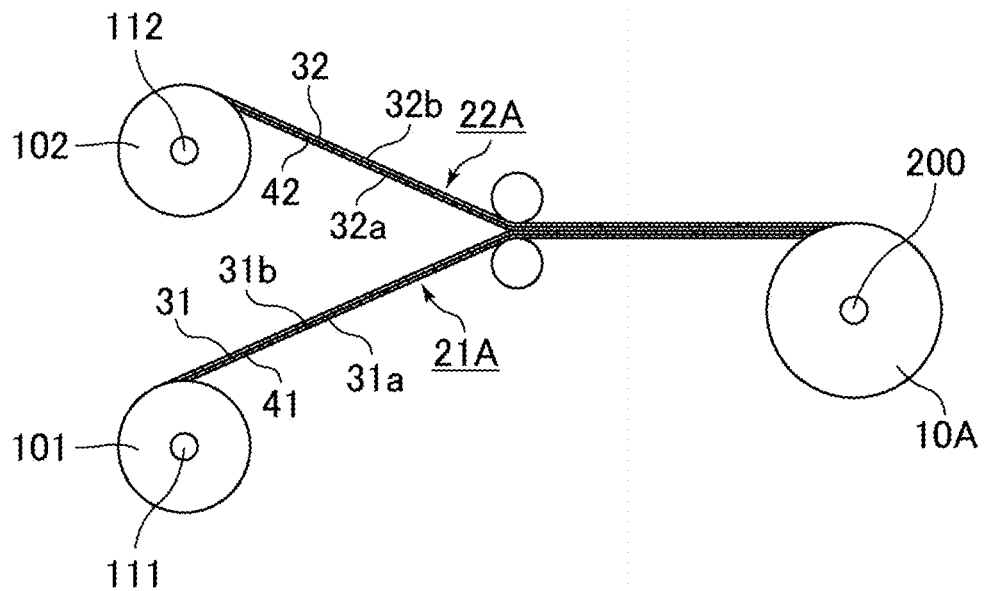
FIG. 9 is a schematic cross-sectional view showing a step of preparing a laminate in an example of a method of producing the film capacitor of Embodiment 1 of the present invention.

FIG. 9 is a schematic cross-sectional view showing a step of preparing a laminate in an example of a method of producing the film capacitor of Embodiment 1 of the present invention.

First, as shown in FIG. 9, a first film reel 101 with the first metallized film 21A wound around a first reel shaft 111 and a second film reel 102 with the second metallized film 22A wound around a second reel shaft 112 are provided.

Next, the first metallized film 21A is unwound from the first film reel 101, and the second metallized film 22A is unwound from the second film reel 102. At this time, the first metallized film 21A and the second metallized film 22A are unwound such that the second main surface 31b of the first dielectric film 31 faces the third main surface 32a of the second dielectric film 32.

The first metallized film 21A and the second metallized film 22A unwound are then wound around a winding shaft 200 while being on top of each other and shifted from each other in the width direction.

Figure 10:
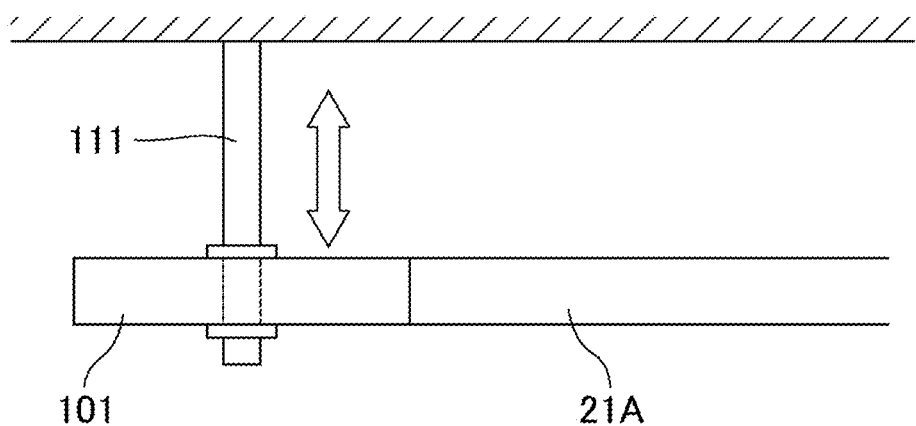
FIG. 10 is a schematic top view showing unwinding the first metallized film from a first film reel in FIG. 9.

Here, in unwinding the first metallized film 21A, the first reel shaft 111 is periodically oscillated in width directions perpendicular to the unwinding direction. FIG. 10 is a schematic top view showing unwinding the first metallized film from the first film reel in FIG. 9. As shown in FIG. 10, the first reel shaft 111 periodically oscillates in the width directions (directions indicated by the double-headed arrow), allowing the first metallized film 21A to periodically move in the same width directions during unwinding.

Similarly, in unwinding the second metallized film 22A, the second reel shaft 112 is periodically oscillated in the width directions perpendicular to the unwinding direction. This allows the second metallized film 22A to periodically move in the same width directions during unwinding.

As described above, the first metallized film 21A and the second metallized film 22A are unwound while periodically moving in the width direction. As a result, the laminate 10A as shown in FIG. 2, which includes the first unevenness 11a at the first end surface 10Aa and the second unevenness 12a at the second end surface 10Ab, is prepared in a wound state around the winding shaft 200.

Adjusting the oscillation conditions such as the oscillation timing, the oscillation period, and the oscillation amplitude in oscillating the first reel shaft 111 and the second reel shaft 112 can adjust the height and the pitch of the first unevenness 11a and the height and the pitch of the second unevenness 12a.

Adjusting the winding rate of the winding shaft 200 in combination with the oscillation conditions of the first reel shaft 111 and the second reel shaft 112 can also adjust the height and the pitch of the first unevenness 11a and the height and the pitch of the second unevenness 12a.

For example, under the condition where the first reel shaft 111 and the second reel shaft 112 have the same oscillation timing and the same oscillation period and the winding shaft 200 has a constant winding rate, the first unevenness 11a and the second unevenness 12a have a similar pitch.

Under the condition where the first reel shaft 111 and the second reel shaft 112 have the same oscillation timing and the same oscillation period and the winding shaft 200 has a constant winding rate, larger oscillation amplitudes of the first reel shaft 111 and the second reel shaft 112 results in a larger height of the first unevenness 11a and a larger height of the second unevenness 12a.

Under the condition where the first reel shaft 111 and the second reel shaft 112 have the same oscillation timing, the same oscillation period, and the same oscillation amplitude, a slower winding rate of the winding shaft 200 results in a smaller pitch of the first unevenness 11a and a smaller pitch of the second unevenness 12a.

Here, the laminate 10A as shown in FIG. 2 can be prepared in a wound state around the winding shaft 200 also by oscillating the winding shaft 200 in the width directions or oscillating running rolls, which run the first metallized film 21A and the second metallized film 22A, in the width directions instead of oscillating the first reel shaft 111 and the second reel shaft 112 in the width directions.

If necessary, the laminate 10A may be pressed in the direction perpendicular to the width direction to be formed into an oval cylindrical shape.

Step of Forming External Electrodes

For example, a metal such as zinc, aluminum, tin, or a zinc-aluminum alloy is thermally sprayed onto the first end surface 10Aa of the laminate 10A to form the first external electrode 51 shown in FIG. 2 such that it is connected to the first metal layer 41. At this time, adjusting the thermal spray conditions such as the distance from the thermal spray nozzle to the first end surface 10Aa of the laminate 10A and the air pressure of the thermal spray nozzle can adjust the length of the first gaps 71a in the width direction while forming the first gaps 71a shown in FIG. 2 between the second dielectric film 32 and the first external electrode 51.

Further, for example, a metal such as zinc, aluminum, tin, or a zinc-aluminum alloy is thermally sprayed onto the second end surface 10Ab of the laminate 10A to form the second external electrode 52 shown in FIG. 2 such that it is connected to the second metal layer 42. At this time, adjusting the thermal spray conditions such as the distance from the thermal spray nozzle to the second end surface 10Ab of the laminate 10A and the air pressure of the thermal spray nozzle can adjust the length of the second gaps 72a in the width direction while forming the second gaps 72a shown in FIG. 2 between the first dielectric film 31 and the second external electrode 52.

Thereafter, a conductor terminal may be connected to each of the first external electrode 51 and the second external electrode 52, if necessary, and the laminate 10A, the first external electrode 51, and the second external electrode 52 may then be encapsulated with a resin.

The above steps produce the film capacitor 1 shown in the FIG. 1 and FIG. 2.

Embodiment 2

A film capacitor of Embodiment 2 of the present invention differs from the film capacitor of Embodiment 1 of the present invention in that the second metal layer is provided on the second main surface of the first dielectric film.

Figure 11:
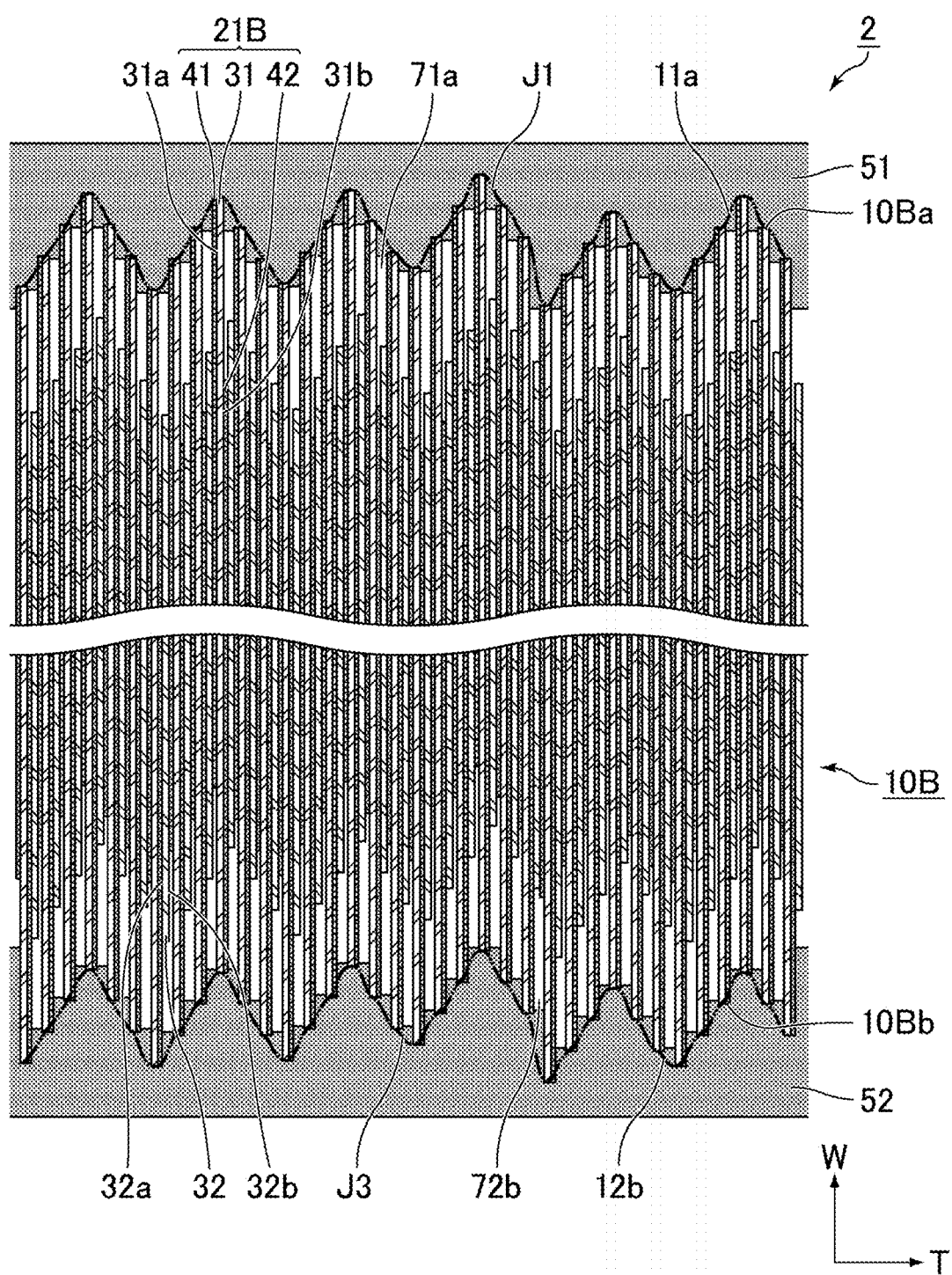
FIG. 11 is a schematic cross-sectional view showing an example of a film capacitor of Embodiment 2 of the present invention.

FIG. 11 is a schematic cross-sectional view showing an example of a film capacitor of Embodiment 2 of the present invention.

As shown in FIG. 11, a film capacitor 2 includes a laminate 10B, the first external electrode 51, and the second external electrode 52.

The laminate 10B includes a first end surface 10Ba and a second end surface 10Bb opposing each other in the width direction W.

The laminate 10B is a wound body in which a first metallized film 21B and the second dielectric film 32 are wound while being laminated in the thickness direction T.

The first metallized film 21B includes the first dielectric film 31, the first metal layer 41, and the second metal layer 42.

The first metal layer 41 in the laminate 10B is provided on the first main surface 31a of the first dielectric film 31, as with the laminate 10A shown in FIG. 2.

Specifically, the first metal layer 41 is provided on the first main surface 31a of the first dielectric film 31 such that it extends to the first side edge of the first dielectric film 31 but not to the second side edge of the first dielectric film 31 in the width direction W.

Unlike in the laminate 10A shown in FIG. 2, in the laminate 10B the second metal layer 42 is provided on the second main surface 31b of the first dielectric film 31. Specifically, the second metal layer 42 is provided on the second main surface 31b of the first dielectric film 31 such that it does not extend to the first side edge of the first dielectric film 31 but extends to the second side edge of the first dielectric film 31 in the width direction W.

In the laminate 10B, no metal layer is provided on the third main surface 32a and the fourth main surface 32b of the second dielectric film 32.

In the laminate 10B, the first dielectric film 31 is longer than the second dielectric film 32 in the width direction W. This allows the end of the first metal layer 41 which extends to the side edge of the first dielectric film 31 to be exposed at the first end surface 10Ba of the laminate 10B and allows the end of the second metal layer 42 which extends to the side edge of the first dielectric film 31 to be exposed at the second end surface 10Bb of the laminate 10B. In other words, of the first metallized film 21B and the second dielectric film 32 adjacent to each other in the thickness direction T, the first metallized film 21B protrudes toward the first external electrode 51 and toward the second external electrode 52 with respect to the second dielectric film 32. In this state, the first metal layer 41 is connected to the first external electrode 51 and not connected to the second external electrode 52. The second metal layer 42 is connected to the second external electrode 52 and not connected to the first external electrode 51.

In the laminate 10B, the first metallized film 21B and the second dielectric film 32 adjacent to each other in the thickness direction T are in the above positional relationship. Thus, of the first dielectric film 31 and the second dielectric film 32 adjacent to each other in the thickness direction T, the first dielectric film 31 provided with the first metal layer 41 on the first main surface 31a protrudes toward the first external electrode 51 with respect to the second dielectric film 32 not provided with the first metal layer 41 on the main surfaces. Of the first dielectric film 31 and the second dielectric film 32 adjacent to each other in the thickness direction T, the first dielectric film 31 provided with the second metal layer 42 on the second main surface 31b protrudes toward the second external electrode 52 with respect to the second dielectric film 32 not provided with the second metal layer 42 on the main surfaces.

In a cross section along the thickness direction T and the width direction W as shown in FIG. 11, the first end surface 10Ba of the laminate 10B includes the first unevenness 11a continuously in the thickness direction T, as with the first end surface 10Aa of the laminate 10A shown in FIG. 2. The first unevenness 11a has a profile defined by the curve J1 that connects the ends of the first dielectric film 31 provided with the first metal layer 41 on the first main surface 31a.

In the film capacitor 2, as with the film capacitor 1 shown in FIG. 2, the first unevenness 11a has a height of 0.07 mm to 0.25 mm and a pitch of 0.07 mm to 0.15 mm as measured based on JIS B 0601:2001.

In the film capacitor 2, as with the film capacitor 1 shown in FIG. 2, the first gaps 71a are present in the width direction W between the second dielectric film 32 not provided with the first metal layer 41 on the main surfaces and the first external electrode 51.

In the film capacitor 2, as with the film capacitor 1 shown in FIG. 2, the first gaps 71a have a length in the width direction W of 0.3 mm or greater.

In a cross section along the thickness direction T and the width direction W as shown in FIG. 11, the second end surface 10Bb of the laminate 10B includes second unevenness 12b continuously in the thickness direction T. The second unevenness 12b has a profile defined by a curve J3 that connects the ends of the first dielectric film 31 provided with the second metal layer 42 on the second main surface 31b. Specifically, the curve J3 connects the central points, in the thickness direction T, of the ends of the first dielectric film 31. In the laminate 10B, the second end surface 10Bb can be regarded as being defined by the curve J3 and having an uneven shape defined by the second unevenness 12b.

In the film capacitor 2, the second unevenness 12b has a height of 0.07 mm to 0.25 mm and a pitch of 0.07 mm to 0.15 mm as measured based on JIS B 0601:2001.

The height of the second unevenness 12b is determined in the same manner as for the height of the first unevenness 11a.

The pitch of the second unevenness 12b is determined in the same manner as for the pitch of the first unevenness 11a.

In the film capacitor 2, second gaps 72b are present in the width direction W between the second dielectric film 32 not provided with the second metal layer 42 on the main surfaces and the second external electrode 52.

In the film capacitor 2, the second gaps 72b have a length in the width direction W of 0.3 mm or greater.

The second gaps 72b preferably have a length in the width direction W of 1.5 mm or less.

The second gaps 72b preferably have a length in the width direction W of 0.5 mm to 1.5 mm.

The length of the second gaps 72b in the width direction W may be the same as or different from the length of the first gaps 71a in the width direction W.

The length of the second gaps 72b in the width direction W is determined in the same manner as for the length of the first gaps 71a in the width direction W.

As described above, of the first dielectric film 31 and the second dielectric film 32 adjacent to each other in the thickness direction T, the first dielectric film 31 protrudes toward the second external electrode 52 with respect to the second dielectric film 32. The length of the second gaps 72b in the width direction W is not greater than the protruding length of the first dielectric film 31 in the width direction W with respect to the second dielectric film 32. Specifically, the length of the second gaps 72b in the width direction W may be the same as or smaller than the protruding length of the first dielectric film 31 in the width direction W with respect to the second dielectric film 32.

As described above, in the film capacitor 2, the first unevenness 11a and the second unevenness 12b have a height and a pitch in the above ranges, and the first gaps 71a and the second gaps 72b have a length in the width direction W in the above range. The film capacitor 2 thus has the same effects as the film capacitor 1 shown in FIG. 2.

Embodiment 3

A film capacitor of Embodiment 3 of the present invention differs from the film capacitor of Embodiment 1 of the present invention in that the second metal layer is provided on the first main surface of the first dielectric film and spaced from the first metal layer, and that a third metal layer connected neither to the first external electrode nor to the second external electrode is provided on the third main surface of the second dielectric film.

Figure 12:
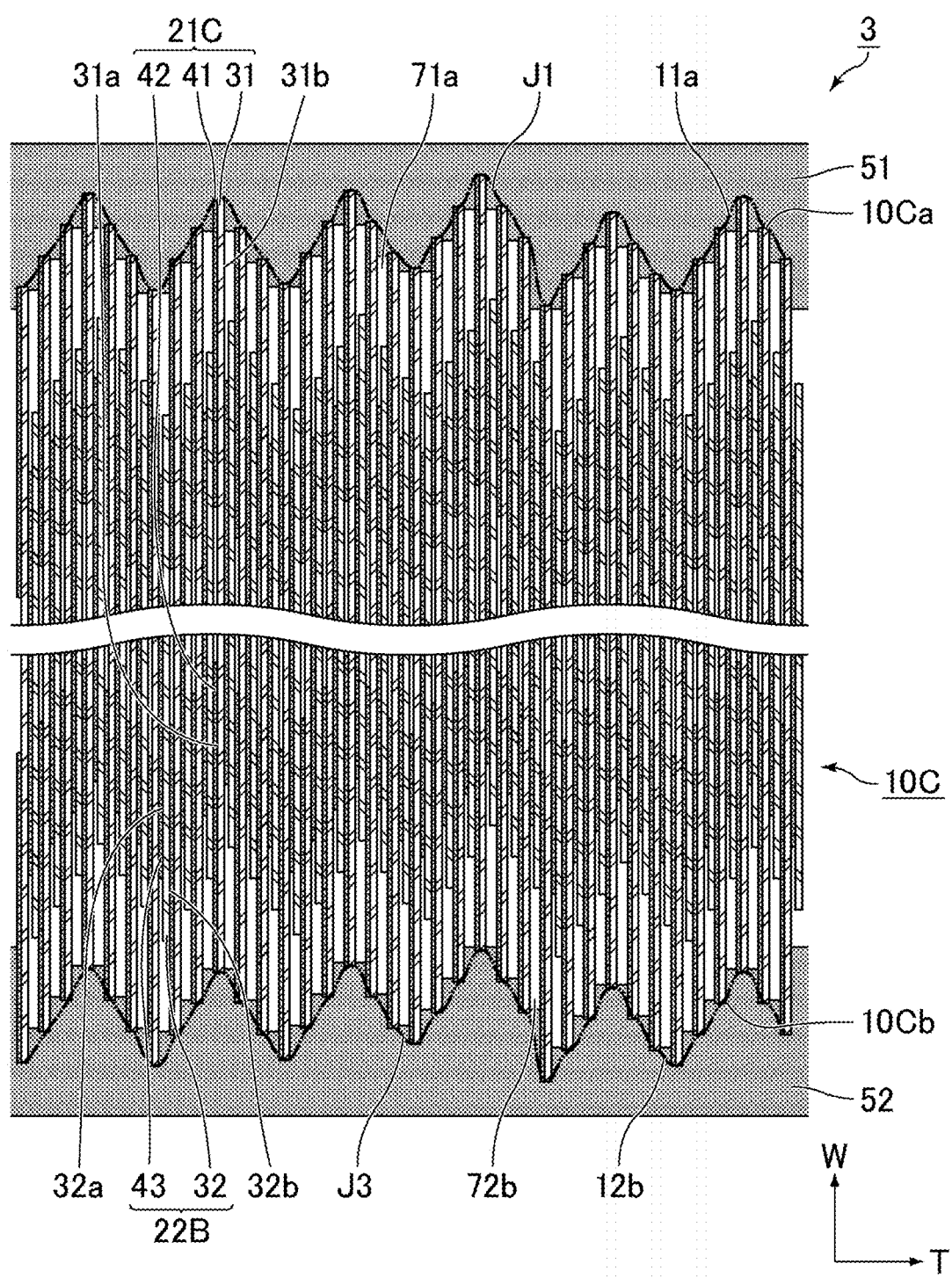
FIG. 12 is a schematic cross-sectional view showing an example of a film capacitor of Embodiment 3 of the present invention.

FIG. 12 is a schematic cross-sectional view showing an example of a film capacitor of Embodiment 3 of the present invention.

As shown in FIG. 12, a film capacitor 3 includes a laminate 10C, the first external electrode 51, and the second external electrode 52.

The laminate 10C includes a first end surface 10Ca and a second end surface 10Cb opposing each other in the width direction W.

The laminate 10C is a wound body in which a first metallized film 21C and a second metallized film 22B are wound while being laminated in the thickness direction T.

The first metallized film 21C includes the first dielectric film 31, the first metal layer 41, and the second metal layer 42.

The first metal layer 41 in the laminate 10C is provided on the first main surface 31a of the first dielectric film 31, as with the laminate 10A shown in FIG. 2. Specifically, the first metal layer 41 is provided on the first main surface 31a of the first dielectric film 31 such that it extends to the first side edge of the first dielectric film 31 but not to the second side edge of the first dielectric film 31 in the width direction W.

Unlike in the laminate 10A shown in FIG. 2, in the laminate 10C the second metal layer 42 is provided on the first main surface 31a of the first dielectric film 31 and spaced from the first metal layer 41. Specifically, the second metal layer 42 is provided on the first main surface 31a of the first dielectric film 31 such that it does not extend to the first side edge of the first dielectric film 31 but extends to the second side edge of the first dielectric film 31 in the width direction W.

The second metallized film 22B includes the second dielectric film 32 and a third metal layer 43.

Unlike in the laminate 10A shown in FIG. 2, in the laminate 10C the third metal layer 43 is provided on the third main surface 32a of the second dielectric film 32. Specifically, the third metal layer 43 is provided on the third main surface 32a of the second dielectric film 32 such that it does not extend to the first side edge and the second side edge of the second dielectric film 32 in the width direction W.

In the laminate 10C, the first dielectric film 31 is longer than the second dielectric film 32 in the width direction W. This allows the end of the first metal layer 41 which extends to the side edge of the first dielectric film 31 to be exposed at the first end surface 10Ca of the laminate 10C and allows the end of the second metal layer 42 which extends to the side edge of the first dielectric film 31 to be exposed at the second end surface 10Cb of the laminate 10C. In other words, of the first metallized film 21C and the second metallized film 22B adjacent to each other in the thickness direction T, the first metallized film 21C protrudes toward the first external electrode 51 and toward the second external electrode 52 with respect to the second metallized film 22B. In this state, the first metal layer 41 is connected to the first external electrode 51 and not connected to the second external electrode 52. The second metal layer 42 is connected to the second external electrode 52 and not connected to the first external electrode 51. The third metal layer 43 is connected neither to the first external electrode 51 nor to the second external electrode 52. Thus, in the film capacitor 3, a capacitor including the first metal layer 41 and the third metal layer 43 and a capacitor including the second metal layer 42 and the third metal layer 43 are connected in series.

In the laminate 10C, the first metallized film 21C and the second metallized film 22B adjacent to each other in the thickness direction T are in the above positional relationship. Thus, of the first dielectric film 31 and the second dielectric film 32 adjacent to each other in the thickness direction T, the first dielectric film 31 provided with the first metal layer 41 on the first main surface 31a protrudes toward the first external electrode 51 with respect to the second dielectric film 32 not provided with the first metal layer 41 on the main surfaces. Of the first dielectric film 31 and the second dielectric film 32 adjacent to each other in the thickness direction T, the first dielectric film 31 provided with the second metal layer 42 on the first main surface 31a protrudes toward the second external electrode 52 with respect to the second dielectric film 32 not provided with the second metal layer 42 on the main surfaces.

In a cross section along the thickness direction T and the width direction W as shown in FIG. 12, the first end surface 10Ca of the laminate 10C includes the first unevenness 11a continuously in the thickness direction T, as with the first end surface 10Aa of the laminate 10A shown in FIG. 2. The first unevenness 11a has a profile defined by the curve J1 that connects the ends of the first dielectric film 31 provided with the first metal layer 41 on the first main surface 31a.

In the film capacitor 3, as with the film capacitor 1 shown in FIG. 2, the first unevenness 11a has a height of 0.07 mm to 0.25 mm and a pitch of 0.07 mm to 0.15 mm as measured based on JIS B 0601:2001.

In the film capacitor 3, as with the film capacitor 1 shown in FIG. 2, the first gaps 71a are present in the width direction W between the second dielectric film 32 not provided with the first metal layer 41 on the main surfaces and the first external electrode 51.

In the film capacitor 3, as with the film capacitor 1 shown in FIG. 2, the first gaps 71a have a length in the width direction W of 0.3 mm or greater.

In a cross section along the thickness direction T and the width direction W as shown in FIG. 12, the second end surface 10Cb of the laminate 10C includes the second unevenness 12b continuously in the thickness direction T. The second unevenness 12b has a profile defined by the curve J3 that connects the ends of the first dielectric film 31 provided with the second metal layer 42 on the first main surface 31a. In the laminate 10C, the second end surface 10Cb can be regarded as being defined by the curve J3 and having an uneven shape defined by the second unevenness 12b.

In the film capacitor 3, the second unevenness 12b has a height of 0.07 mm to 0.25 mm and a pitch of 0.07 mm to 0.15 mm as measured based on JIS B 0601:2001.

In the film capacitor 3, the second gaps 72b are present in the width direction W between the second dielectric film 32 not provided with the second metal layer 42 on the main surfaces and the second external electrode 52.

In the film capacitor 3, the second gaps 72b have a length in the width direction W of 0.3 mm or greater.

As described above, in the film capacitor 3, the first unevenness 11a and the second unevenness 12b have a height and a pitch in the above ranges, and the first gaps 71a and the second gaps 72b have a length in the width direction W in the above range. The film capacitor 3 thus has the same effects as the film capacitor 1 shown in FIG. 2.

Embodiment 4

A film capacitor of Embodiment 4 of the present invention differs from the film capacitor of Embodiment 1 of the present invention in that the second metal layer is provided on the first main surface of the first dielectric film and spaced from the first metal layer, and that the third metal layer connected neither to the first external electrode nor to the second external electrode is provided on the second main surface of the first dielectric film.

Figure 13:
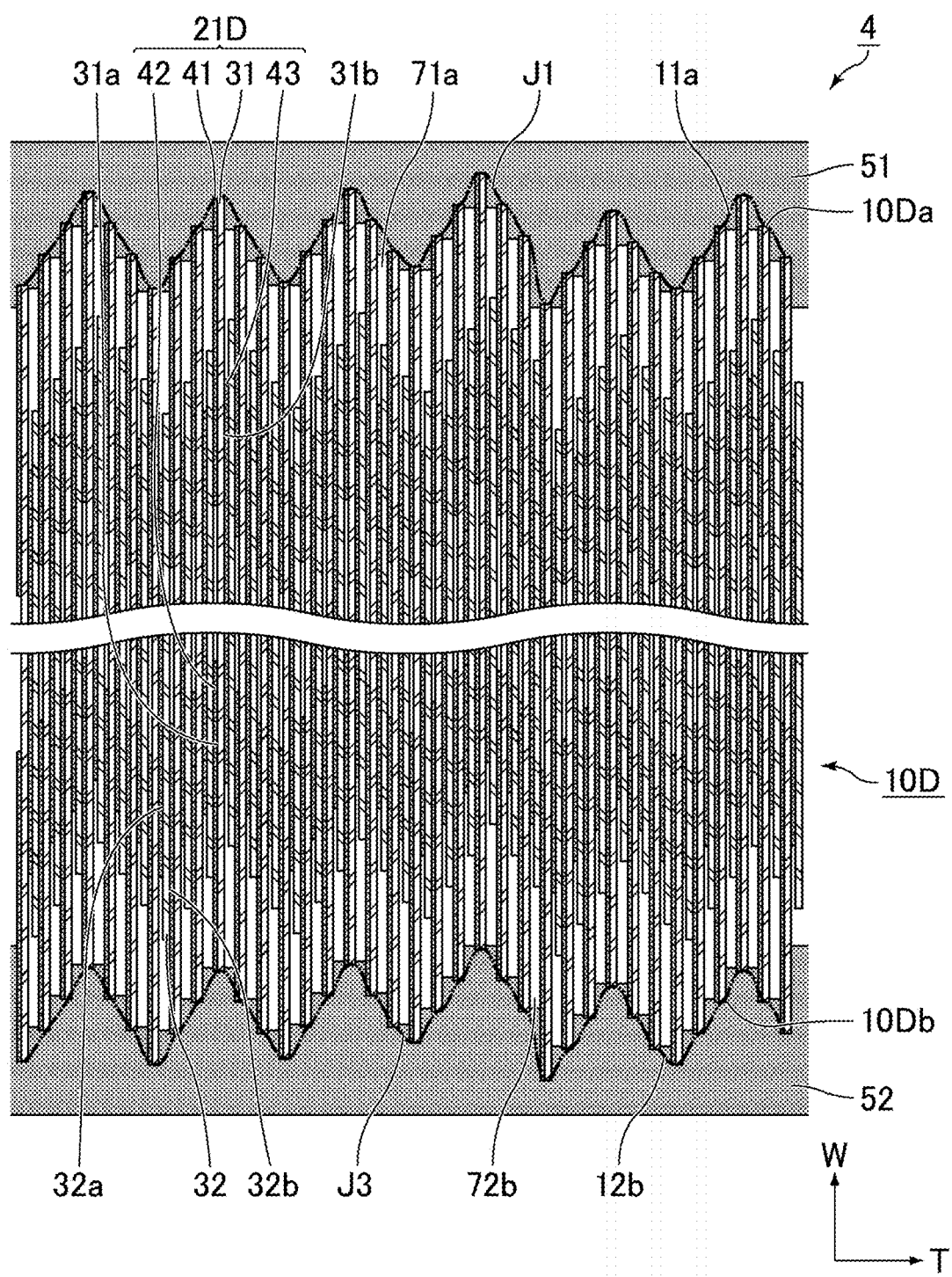
FIG. 13 is a schematic cross-sectional view showing an example of a film capacitor of Embodiment 4 of the present invention.

FIG. 13 is a schematic cross-sectional view showing an example of a film capacitor of Embodiment 4 of the present invention.

As shown in FIG. 13, a film capacitor 4 includes a laminate 10D, the first external electrode 51, and the second external electrode 52.

The laminate 10D includes a first end surface 10Da and a second end surface 10Db opposing each other in the width direction W.

The laminate 10D is a wound body in which a first metallized film 21D and the second dielectric film 32 are wound while being laminated in the thickness direction T.

The first metallized film 21D includes the first dielectric film 31, the first metal layer 41, the second metal layer 42, and the third metal layer 43.

The first metal layer 41 in the laminate 10D is provided on the first main surface 31a of the first dielectric film 31, as with the laminate 10A shown in FIG. 2.

Specifically, the first metal layer 41 is provided on the first main surface 31a of the first dielectric film 31 such that it extends to the first side edge of the first dielectric film 31 but not to the second side edge of the first dielectric film 31 in the width direction W.

Unlike in the laminate 10A shown in FIG. 2, in the laminate 10D the second metal layer 42 is provided on the first main surface 31a of the first dielectric film 31 and spaced from the first metal layer 41. Specifically, the second metal layer 42 is provided on the first main surface 31a of the first dielectric film 31 such that it does not extend to the first side edge of the first dielectric film 31 but extends to the second side edge of the first dielectric film 31 in the width direction W.

Unlike in the laminate 10A shown in FIG. 2, in the laminate 10D the third metal layer 43 is provided on the second main surface 31b of the first dielectric film 31. Specifically, the third metal layer 43 is provided on the second main surface 31b of the first dielectric film 31 such that it does not extend to the first side edge and the second side edge of the first dielectric film 31 in the width direction W.

In the laminate 10D, no metal layer is provided on the third main surface 32a and the fourth main surface 32b of the second dielectric film 32.

In the laminate 10D, the first dielectric film 31 is longer than the second dielectric film 32 in the width direction W. This allows the end of the first metal layer 41 which extends to the side edge of the first dielectric film 31 to be exposed at the first end surface 10Da of the laminate 10D and allows the end of the second metal layer 42 which extends to the side edge of the first dielectric film 31 to be exposed at the second end surface 10Db of the laminate 10D. In other words, of the first metallized film 21D and the second dielectric film 32 adjacent to each other in the thickness direction T, the first metallized film 21D protrudes toward the first external electrode 51 and toward the second external electrode 52 with respect to the second dielectric film 32. In this state, the first metal layer 41 is connected to the first external electrode 51 and not connected to the second external electrode 52. The second metal layer 42 is connected to the second external electrode 52 and not connected to the first external electrode 51. The third metal layer 43 is connected neither to the first external electrode 51 nor to the second external electrode 52. Thus, in the film capacitor 4, a capacitor including the first metal layer 41 and the third metal layer 43 and a capacitor including the second metal layer 42 and the third metal layer 43 are connected in series.

In the laminate 10D, the first metallized film 21D and the second dielectric film 32 adjacent to each other in the thickness direction T are in the above positional relationship. Thus, of the first dielectric film 31 and the second dielectric film 32 adjacent to each other in the thickness direction T, the first dielectric film 31 provided with the first metal layer 41 on the first main surface 31a protrudes toward the first external electrode 51 with respect to the second dielectric film 32 not provided with the first metal layer 41 on the main surfaces. Of the first dielectric film 31 and the second dielectric film 32 adjacent to each other in the thickness direction T, the first dielectric film 31 provided with the second metal layer 42 on the first main surface 31a protrudes toward the second external electrode 52 with respect to the second dielectric film 32 not provided with the second metal layer 42 on the main surfaces.

In a cross section along the thickness direction T and the width direction W as shown in FIG. 13, as with the first end surface 10Aa of the laminate 10A shown in FIG. 2, the first end surface 10Da of the laminate 10D includes the first unevenness 11a continuously in the thickness direction T. The first unevenness 11a has a profile defined by the curve J1 that connects the ends of the first dielectric film 31 provided with the first metal layer 41 on the first main surface 31a.

In the film capacitor 4, as with the film capacitor 1 shown in FIG. 2, the first unevenness 11a has a height of 0.07 mm to 0.25 mm and a pitch of 0.07 mm to 0.15 mm as measured based on JIS B 0601:2001.

In the film capacitor 4, as with the film capacitor 1 shown in FIG. 2, the first gaps 71a are present in the width direction W between the second dielectric film 32 not provided with the first metal layer 41 on the main surfaces and the first external electrode 51.

In the film capacitor 4, as with the film capacitor 1 shown in FIG. 2, the first gaps 71a have a length in the width direction W of 0.3 mm or greater.

In a cross section along the thickness direction T and the width direction W as shown in FIG. 13, the second end surface 10Db of the laminate 10D includes the second unevenness 12b continuously in the thickness direction T. The second unevenness 12b has a profile defined by the curve J3 that connects the ends of the first dielectric film 31 provided with the second metal layer 42 on the first main surface 31a. In the laminate 10D, the second end surface 10Db can be regarded as being defined by the curve J3 and having an uneven shape defined by the second unevenness 12b.

In the film capacitor 4, the second unevenness 12b has a height of 0.07 mm to 0.25 mm and a pitch of 0.07 mm to 0.15 mm as measured based on JIS B 0601:2001.

In the film capacitor 4, the second gaps 72b are present in the width direction W between the second dielectric film 32 not provided with the second metal layer 42 on the main surfaces and the second external electrode 52.

In the film capacitor 4, the second gaps 72b have a length in the width direction W of 0.3 mm or greater.

As described above, in the film capacitor 4, the first unevenness 11a and the second unevenness 12b have a height and a pitch in the above ranges, and the first gaps 71a and the second gaps 72b have a length in the width direction W in the above range. The film capacitor 4 thus has the same effects as the film capacitor 1 shown in FIG. 2.

Examples

Examples that more specifically disclose the film capacitor of the present invention are described below. The present invention is not limited to these examples.

Film capacitor samples 1 to 45 were produced by the following method.

Step of Preparing Metallized Films

First, a phenoxy resin that was a bisphenol A epoxy resin as a first organic material was mixed with MDI as a second organic material to prepare a resin solution. The obtained resin solution was formed into a film shape and then cured by heat treatment to prepare a first dielectric film and a second dielectric film. The first dielectric film and the second dielectric film each had a thickness of 3 μm.

Next, aluminum was vapor-deposited on a first main surface of the first dielectric film to form a first metal layer, whereby a first metallized film was prepared. At this time, the first metal layer was formed such that it extended to a first side edge of the first dielectric film but not to a second side edge of the first dielectric film in the width direction. The first metal layer had a thickness of 20 nm.

Aluminum was vapor-deposited on a third main surface of the second dielectric film to form a second metal layer, whereby a second metallized film was prepared. At this time, the second metal layer was formed such that it did not extend to a first side edge of the second dielectric film but extended to a second side edge of the second dielectric film in the width direction. The second metal layer had a thickness of 20 nm.

Step of Preparing Laminate

First, a first film reel with the first metallized film wound around a first reel shaft and a second film reel with the second metallized film wound around a second reel shaft were provided.

Next, the first metallized film was unwound from the first film reel, and the second metallized film was unwound from the second film reel. At this time, the first metallized film and the second metallized film were unwound such that the second main surface of the first dielectric film faced the third main surface of the second dielectric film.

The first metallized film and the second metallized film unwound were then wound around a winding shaft while they were on top of each other and shifted from each other by 1.0 mm in the width direction. The winding rate of the winding shaft was 1 m/sec.

Here, in unwinding the first metallized film, the first reel shaft was periodically oscillated in width directions perpendicular to the unwinding direction. Similarly, in unwinding the second metallized film, the second reel shaft was periodically oscillated in the width directions perpendicular to the unwinding direction. As a result, a laminate including first unevenness at a first end surface and second unevenness at a second end surface was prepared in a wound state around the winding shaft.

In oscillating the first reel shaft and the second reel shaft, the oscillation period and the oscillation amplitude were adjusted while the oscillation timing was the same, such that each film capacitor sample had the height and the pitch of the first unevenness and the height and the pitch of the second unevenness shown in Table 1 as measured by the methods described above. In the film capacitor samples, no significant difference at a significance level of 5% was observed between the height of the first unevenness and the height of the second unevenness, and no significant difference at a significance level of 5% was observed between the pitch of the first unevenness and the pitch of the second unevenness. The heights and the pitches of the first unevenness and the second unevenness are thus simply denoted as "Height H of unevenness" and "Pitch D of unevenness" in Table 1. Each film capacitor sample is simply denoted as "Sample" in Table 1.

The obtained laminate was then pressed in the direction perpendicular to the width direction to be formed into an oval cylindrical shape.

Step of Forming External Electrodes

A zinc-aluminum alloy was thermally sprayed onto the first end surface of the laminate to form a first external electrode connected to the first metal layer.

A zinc-aluminum alloy was thermally sprayed onto the second end surface of the laminate to form a second external electrode connected to the second metal layer.

Here, in forming the first external electrode and the second external electrode, the distance from the thermal spray nozzle to each end surface of the laminate and the air pressure of the thermal spray nozzle were adjusted, such that each film capacitor sample had first gaps between the second dielectric film and the first external electrode and second gaps between the first dielectric film and the second external electrode, and that the first gaps and the second gaps had the length in the width direction shown in Table 1 as measured by the method described above. In the film capacitor samples, no significant difference at a significance level of 5% was observed between the length of the first gaps in the width direction and the length of the second gaps in the width direction. The lengths of the first gaps and the second gaps are thus simply denoted as "Length L of gaps" in Table 1.

Thereafter, a conductor terminal was connected to each of the first external electrode and the second external electrode, and the laminate, the first external electrode, and the second external electrode were then encapsulated with a resin.

Through the above steps, film capacitor samples 1 to 45 were produced.

Evaluation

The film capacitor samples 1 to 45 were subjected to an air-to-air thermal shock test (hereinafter also simply a "test") in which 1000 temperature cycles were performed, one cycle consisting of keeping the sample at a minimum temperature of −40° C. for 30 minutes and keeping the sample at a maximum temperature of 125° C. for 30 minutes. The change in the equivalent series resistance (ESR) of each film capacitor sample before and after the test was evaluated in accordance with the following criteria. Table 1 shows the evaluation results.

Good: The ESR after the test was not higher than 1.5 times the ESR before the test.

Fair: The ESR after the test was higher than 1.5 times but not higher than 2 times the ESR before the test.

Poor: The ESR after the test was higher than 2 times the ESR before the test.

TABLE 1

| | Length L of gaps (mm) | Height H of unevenness (mm) | Pitch D of unevenness (mm) | Evaluation |
|---|---|---|---|---|
| *Sample 1 | L < 0.3 | H < 0.07 | 0.05 | Poor |
| *Sample 2 | | | 0.07 | Poor |
| *Sample 3 | | | 0.1 | Poor |
| *Sample 4 | | | 0.15 | Poor |
| *Sample 5 | | | 0.2 | Poor |
| *Sample 6 | | 0.07 ≤ H ≤ 0.25 | 0.05 | Poor |
| *Sample 7 | | | 0.07 | Poor |
| *Sample 8 | | | 0.1 | Poor |
| *Sample 9 | | | 0.15 | Poor |
| *Sample 10 | | | 0.2 | Poor |
| *Sample 11 | | 0.25 < H | 0.05 | Poor |
| *Sample 12 | | | 0.07 | Poor |
| *Sample 13 | | | 0.1 | Poor |
| *Sample 14 | | | 0.15 | Poor |
| *Sample 15 | | | 0.2 | Poor |
| *Sample 16 | 0.3 ≤ L < 0.5 | H < 0.07 | 0.05 | Poor |
| *Sample 17 | | | 0.07 | Poor |
| *Sample 18 | | | 0.1 | Poor |
| *Sample 19 | | | 0.15 | Poor |
| *Sample 20 | | | 0.2 | Poor |
| *Sample 21 | | 0.07 ≤ H ≤ 0.25 | 0.05 | Poor |
| Sample 22 | | | 0.07 | Fair |
| Sample 23 | | | 0.1 | Fair |
| Sample 24 | | | 0.15 | Fair |
| *Sample 25 | | | 0.2 | Poor |
| *Sample 26 | | 0.25 < H | 0.05 | Poor |
| *Sample 27 | | | 0.07 | Poor |
| *Sample 28 | | | 0.1 | Poor |
| *Sample 29 | | | 0.15 | Poor |
| *Sample 30 | | | 0.2 | Poor |
| *Sample 31 | 0.5 ≤ L | H < 0.07 | 0.05 | Poor |
| *Sample 32 | | | 0.07 | Poor |
| *Sample 33 | | | 0.1 | Poor |
| *Sample 34 | | | 0.15 | Poor |
| *Sample 35 | | | 0.2 | Poor |
| *Sample 36 | | 0.07 ≤ H ≤ 0.25 | 0.05 | Poor |
| Sample 37 | | | 0.07 | Good |
| Sample 38 | | | 0.1 | Good |
| Sample 39 | | | 0.15 | Good |
| *Sample 40 | | | 0.2 | Poor |

TABLE 1-continued

| | Length L of gaps (mm) | Height H of unevenness (mm) | Pitch D of unevenness (mm) | Evaluation |
|---|---|---|---|---|
| *Sample 41 | | 0.25 < H | 0.05 | Poor |
| *Sample 42 | | | 0.07 | Poor |
| *Sample 43 | | | 0.1 | Poor |
| *Sample 44 | | | 0.15 | Poor |
| *Sample 45 | | | 0.2 | Poor |

In Table 1, the sample names marked with "*" denote comparative examples outside of the scope of the present invention.

As shown in Table 1, the film capacitor samples 22, 23, 24, 37, 38, and 39, which had a height of unevenness of 0.07 mm to 0.25 mm, a pitch of unevenness of 0.07 mm to 0.15 mm, and a length of gaps of 0.3 mm or greater, reduced an increase in ESR after the test as compared with other film capacitor samples. This suggests that cracking near the boundaries between the metallized films and the external electrodes was reduced in the film capacitor samples 22, 23, 24, 37, 38, and 39 even when they were used under repeated high and low temperature conditions. Here, a simulated relationship between the length of gaps and the stress occurring in the external electrodes showed that the stress occurring in the external electrodes was small when the length of gaps was 0.3 mm or greater, as compared with when the length of gaps was less than 0.3 mm. This also suggests that cracking near the boundaries between the metallized films and the external electrodes was reduced in the film capacitor samples 22, 23, 24, 37, 38, and 39. Moreover, because the film capacitor samples 22, 23, 24, 37, 38, and 39 had a height of unevenness of 0.07 mm to 0.25 mm and a pitch of unevenness of 0.07 mm to 0.15 mm, the film capacitor samples 22, 23, 24, 37, 38, and 39 are considered to have a sufficiently large contact area between the metallized films and the external electrodes and a higher bonding between the metallized films and the external electrodes.

The film capacitor samples 37, 38, and 39, which had a length of gaps of 0.5 mm or greater, reduced an increase in ESR after the test as compared with the film capacitor samples 22, 23, and 24, which had a length of gaps of 0.3 mm to less than 0.5 mm. This suggests that a length of gaps of 0.5 mm or greater is preferred. Here, a simulated relationship between the length of gaps and the stress occurring in the external electrodes showed that the stress occurring in the external electrodes was small when the length of gaps was 0.5 mm or greater, as compared with when the length of gaps was 0.3 mm to less than 0.5 mm. This suggests that cracking near the boundaries between the metallized films and the external electrodes was sufficiently reduced in the film capacitor samples 37, 38, and 39 as compared with the film capacitor samples 22, 23, and 24, even when they were used under repeated high and low temperature conditions.

REFERENCE SIGNS LIST 1, 2, 3, 4 film capacitor
10A, 10B, 10C, 10D laminate
10Aa, 10Ba, 10Ca, 10Da first end surface of laminate
10Ab, 10Bb, 10Cb, 10Db second end surface of laminate
11a first unevenness
12a, 12b second unevenness
21A, 21B, 21C, 21D first metallized film
22A, 22B second metallized film
31 first dielectric film
31a first main surface of first dielectric film
31b second main surface of first dielectric film
32 second dielectric film
32a third main surface of second dielectric film
32b fourth main surface of second dielectric film
41 first metal layer
42 second metal layer
43 third metal layer
51 first external electrode
52 second external electrode
71a first gaps
72a, 72b second gaps
100 sample
101 first film reel
102 second film reel
111 first reel shaft
112 second reel shaft
200 winding shaft
D1, D2, D3, D4, D5, D1', D2', D3', D4', D5' length of profile element
H1, H2, H3, H4, H5, H1', H2', H3', H4', H5' height of profile element
J1, J1', J2, J2', J3, K curve
L1 distance between central lines
M1, M2 central line
P1 winding start position of metallized films
P2 winding end position of metallized films
R1, R2, R3 region
T thickness direction
W width direction

The invention claimed is:

1. A film capacitor comprising:
a laminate including:
  a first dielectric film including a first main surface and a second main surface opposing each other in a thickness direction;
  a first metal layer on the first main surface of the first dielectric film;
  a second dielectric film including a third main surface and a fourth main surface opposing each other in the thickness direction; and
  a second metal layer on one of the first main surface of the first dielectric film, the second main surface of the first dielectric film, and the third main surface of the second dielectric film, wherein:
  the first dielectric film and the second dielectric film are arranged such that the first main surface of the first dielectric film and the fourth main surface of the second dielectric film face each other in the thickness direction, and the second main surface of the first dielectric film and the third main surface of the second dielectric film face each other in the thickness direction,
  the laminate defines a first end surface and a second end surface opposing each other in a width direction, the width direction being perpendicular to the thickness direction;
a first external electrode on the first end surface of the laminate, the first external electrode being connected to the first metal layer and not connected to the second metal layer; and
a second external electrode on the second end surface of the laminate, the second external electrode being connected to the second metal layer and not connected to the first metal layer, wherein:
of the first dielectric film and the second dielectric film adjacent to each other in the thickness direction, the first dielectric film with the first metal layer on the first main surface protrudes toward the first external electrode with respect to the second dielectric film without the first metal layer on the main surfaces;
in a cross section along the thickness direction and the width direction, the first end surface of the laminate defines a first unevenness continuously along the thickness direction, the first unevenness having a profile defined by a curve that connects ends of the first dielectric film with the first metal layer on the first main surface;
the first unevenness has a height of 0.07 mm to 0.25 mm and a pitch of 0.07 mm to 0.15 mm as measured based on JIS B 0601:2001;
in the width direction, first gaps having a length in the width direction of 0.3 mm or greater are present between the second dielectric film without the first metal layer on the main surfaces and the first external electrode;
of the first dielectric film and the second dielectric film adjacent to each other in the thickness direction, one of the first and second dielectric films with the second metal layer on one of the main surfaces protrudes toward the second external electrode with respect to the other of the first and second dielectric films without the second metal layer on the main surfaces;
in the cross section along the thickness direction and the width direction, the second end surface of the laminate defines a second unevenness continuously along the thickness direction, the second unevenness having a profile defined by a curve that connects ends of the one of the first and second dielectric films with the second metal layer on one of the main surfaces;
the second unevenness has a height of 0.07 mm to 0.25 mm and a pitch of 0.07 mm to 0.15 mm as measured based on JIS B 0601:2001; and
in the width direction, second gaps having a length in the width direction of 0.3 mm or greater are present between the other of the first and second dielectric films without the second metal layer on the main surfaces and the second external electrode.

2. The film capacitor according to claim 1, wherein the length of the first gaps in the width direction is 0.5 mm to 1.5 mm.

3. The film capacitor according to claim 2, wherein the length of the second gaps in the width direction is 0.5 mm to 1.5 mm.

4. The film capacitor according to claim 1, wherein the length of the second gaps in the width direction is 0.5 mm to 1.5 mm.

5. The film capacitor according to claim 1, wherein the second metal layer is on the third main surface of the second dielectric film.

6. The film capacitor according to claim 1, wherein the second metal layer is on the second main surface of the first dielectric film.

7. The film capacitor according to claim 1,
wherein the second metal layer is on the first main surface of the first dielectric film and spaced from the first metal layer, and
a third metal layer connected neither to the first external electrode nor to the second external electrode is on the third main surface of the second dielectric film.

8. The film capacitor according to claim 7, wherein the length of the first gaps in the width direction is 0.5 mm to 1.5 mm.

9. The film capacitor according to claim 8, wherein the length of the second gaps in the width direction is 0.5 mm to 1.5 mm.

10. The film capacitor according to claim 7, wherein the length of the second gaps in the width direction is 0.5 mm to 1.5 mm.

11. The film capacitor according to claim 1,
wherein the second metal layer is on the first main surface of the first dielectric film and spaced from the first metal layer, and
a third metal layer connected neither to the first external electrode nor to the second external electrode is on the second main surface of the first dielectric film.

12. The film capacitor according to claim 11, wherein the length of the first gaps in the width direction is 0.5 mm to 1.5 mm.

13. The film capacitor according to claim 12, wherein the length of the second gaps in the width direction is 0.5 mm to 1.5 mm.

14. The film capacitor according to claim 11, wherein the length of the second gaps in the width direction is 0.5 mm to 1.5 mm.

15. The film capacitor according to claim 1, wherein the laminate is a wound body in which the first dielectric film, the first metal layer, the second dielectric film, and the second metal layer are wound and sequentially laminated in the thickness direction.

* * * * *